(12) United States Patent
Kitamura et al.

(10) Patent No.: US 8,768,649 B2
(45) Date of Patent: Jul. 1, 2014

(54) PHYSICAL AMOUNT MEASURING DEVICE AND PHYSICAL AMOUNT MEASURING METHOD

(75) Inventors: Touru Kitamura, Tokyo (JP); Norihiko Mikoshiba, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 264 days.

(21) Appl. No.: 13/129,987

(22) PCT Filed: Nov. 20, 2009

(86) PCT No.: PCT/JP2009/006266
§ 371 (c)(1),
(2), (4) Date: May 18, 2011

(87) PCT Pub. No.: WO2010/058594
PCT Pub. Date: May 27, 2010

(65) Prior Publication Data
US 2011/0231144 A1 Sep. 22, 2011

(30) Foreign Application Priority Data
Nov. 20, 2008 (JP) ................................ 2008-297107

(51) Int. Cl.
*G06F 17/18* (2006.01)
*G01C 17/38* (2006.01)
*G01C 25/00* (2006.01)
*G01P 21/00* (2006.01)
*G01P 15/18* (2013.01)

(52) U.S. Cl.
CPC ................ *G01P 21/00* (2013.01); *G01C 17/38* (2013.01); *G01C 25/005* (2013.01); *G01P 15/18* (2013.01)
USPC ............... 702/179; 702/85; 702/92; 702/141; 702/150; 702/152; 702/153; 324/244; 324/247

(58) Field of Classification Search
USPC ............. 702/141, 179, 150, 152, 153, 85, 92; 324/244, 247
See application file for complete search history.

(56) References Cited

U.S. PATENT DOCUMENTS 7,177,779 B2 2/2007 Hikida et al.
7,376,527 B2 5/2008 Hikida et al.
(Continued)

FOREIGN PATENT DOCUMENTS

CN 1816730 A 8/2006
EP 1643212 A1 4/2006
(Continued)

OTHER PUBLICATIONS

European Search Report issued in corresponding European Patent Application No. 09827375.8 dated Jul. 18, 2012.
(Continued)

*Primary Examiner* — Mohamed Charioui
*Assistant Examiner* — John Kuan
(74) *Attorney, Agent, or Firm* — Morgan, Lewis & Bockius LLP

(57) ABSTRACT

It is possible to rapidly or highly accurately estimate a highly reliable offset according to situations and improve further the reliability of the estimated offset even if a measurement data is not obtained in a space in which the magnitude of a vector physical quantity to be measured is uniform. The offset included in the obtained vector physical quantity data are statistically estimated based on a predetermined evaluation formula using difference vectors. In the estimation of the offset, reliability information on a reference point is calculated based on at least one of the vector physical quantity data, the difference vectors and a plurality of estimated reference points according to a calculation parameter for calculating the reliability information on the reference point, whether or not the reference point is reliable is determined by comparing the reliability information with a determination threshold value.

52 Claims, 19 Drawing Sheets

(56) References Cited

U.S. PATENT DOCUMENTS

| | | |
|---|---|---|
| 7,653,507 B2 | 1/2010 | Yamada et al. |
| 7,881,900 B2 | 2/2011 | Kitamura et al. |
| 2006/0190174 A1 | 8/2006 | Li et al. |
| 2007/0033818 A1 | 2/2007 | Kitamura et al. |
| 2007/0198209 A1* | 8/2007 | Sato .............................. 702/155 |
| 2007/0276625 A1* | 11/2007 | Hikida et al. ................. 702/152 |
| 2008/0033679 A1* | 2/2008 | Yamada et al. ................. 702/95 |
| 2011/0231144 A1 | 9/2011 | Kitamura et al. |

FOREIGN PATENT DOCUMENTS

| | | |
|---|---|---|
| EP | 1821067 A2 | 8/2007 |
| EP | 2157405 A1 | 2/2010 |
| JP | 5-215553 | 8/1993 |
| JP | 2005-195376 | 7/2005 |
| JP | 2005-249619 | 9/2005 |
| JP | 2006-226810 | 8/2006 |
| JP | 2006-337057 | 12/2006 |
| JP | 3985215 B | 7/2007 |
| WO | 2004/003476 | 1/2004 |
| WO | 2005/003683 | 1/2005 |
| WO | 2005/061990 | 7/2005 |
| WO | 2006/016671 | 2/2006 |
| WO | 2007/077859 | 7/2007 |
| WO | 2008/146757 A1 | 12/2008 |
| WO | 2010058594 A1 | 5/2010 |

OTHER PUBLICATIONS

International Search Report from PCT/JP2009/006266 (PCT corresponding to present application).

Office Action issued by the Japanese Patent Office on Oct. 8, 2013 in Japanese Patent Application No. 2011-267014.

Office Action dated Jan. 13, 2014, issued by the State Intellectual Property Office of China for Chinese Patent Application No. 200980146528.7.

* cited by examiner

HIGH ACCURACY →
RESPONSIVENESS ←

| LEVEL | MEASUREMENT PARAMETER | | | DETERMINATION VALUE | | | CALCULATING PARAMETER |
|---|---|---|---|---|---|---|---|
| (DEGREE OF RELIABILITY) | MEASURE-MENT FREQUENCY | NUMBER OF PIECES OF DATA FOR CALCULATING REFERENCE POINTS | ANGLE RANGE BETWEEN DIFFERENCE VECTORS | ANGLE RANGE BETWEEN DIFFERENCE VECTOR AND LINE DRAWN FROM REFERENCE POINT TO DIFFERENCE VECTOR | VARIATION RANGE OF REFERENCE POINT | RANGE OF TIMES WHEN DATA ACQUIRED | NUMBER OF REFERENCE POINTS WHEN VARIATION CALCULATED |
| 1 | | | | | | | |
| 2 | | | | | | | |
| 3 | | | | | | | |

FIG.5

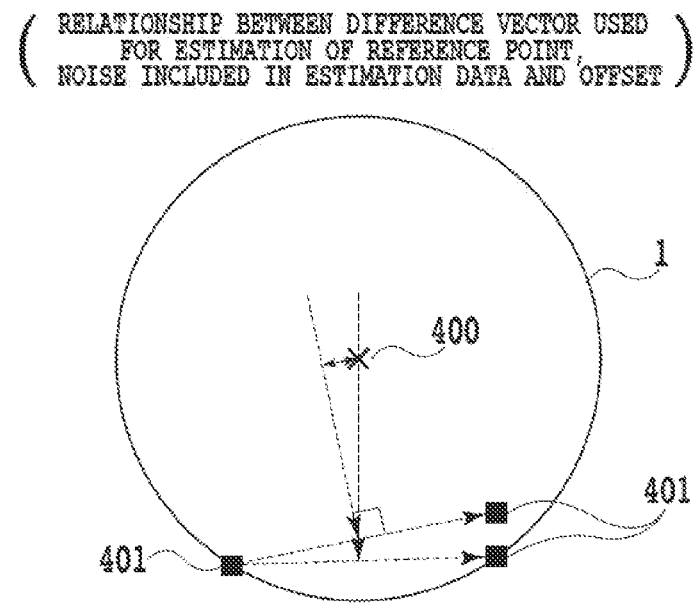
FIG.7A WHEN MAGNITUDE OF DIFFERENCE VECTOR IS LARGE
—— GEOMAGNETIC AZIMUTH CIRCLE 1
× OFFSET    ■ MEASUREMENT DATA
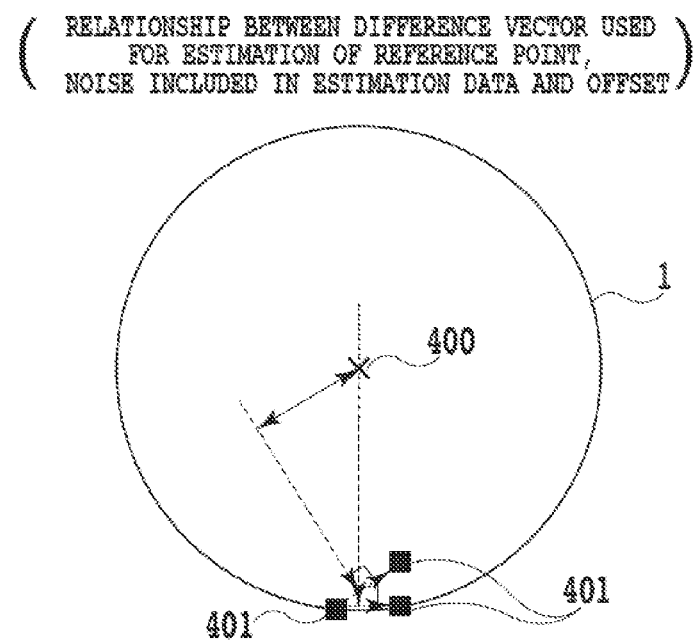
FIG.7B WHEN MAGNITUDE OF DIFFERENCE VECTOR IS SMALL
—— GEOMAGNETIC AZIMUTH CIRCLE 1
× OFFSET    ■ MEASUREMENT DATA

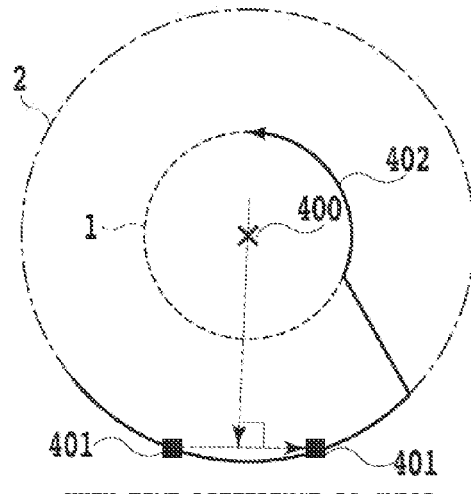

FIG.8A ( RELATIONSHIP BETWEEN DIFFERENCE VECTOR USED FOR ESTIMATION OF REFERENCE POINT, TIME DIFFERENCE IN ACQUISITION OF MEASUREMENT DATA CONSTITUTING DIFFERENCE VECTOR AND OFFSET )

WHEN TIME DIFFERENCE IS SMALL

- - - - - GEOMAGNETIC AZIMUTH CIRCLE 1
- - - - - GEOMAGNETIC AZIMUTH CIRCLE 2
× OFFSET
■ MEASUREMENT DATA
← GEOMAGNETISM TRANSITION

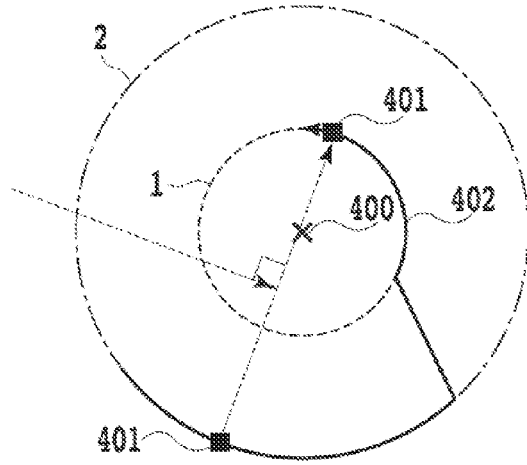

FIG.8B ( RELATIONSHIP BETWEEN DIFFERENCE VECTOR USED FOR ESTIMATION OF REFERENCE POINT, TIME DIFFERENCE IN ACQUISITION OF MEASUREMENT DATA CONSTITUTING DIFFERENCE VECTOR AND OFFSET )

WHEN TIME DIFFERENCE IS LARGE

- - - - - GEOMAGNETIC AZIMUTH CIRCLE 1
- - - - - GEOMAGNETIC AZIMUTH CIRCLE 2
× OFFSET
■ MEASUREMENT DATA
← GEOMAGNETISM TRANSITION

------ GEOMAGNETIC AZIMUTH CIRCLE
+ ESTIMATION OFFSET ([FORMULA 7])

PHYSICAL AMOUNT MEASURING DEVICE AND PHYSICAL AMOUNT MEASURING METHOD

RELATED APPLICATIONS

The present application is a U.S. National Phase Application of International Application No. PCT/JP2009/006266 (filed Nov. 20, 2009) which claims priority to Japanese Patent Application No. 2008-297107 (filed Nov. 20, 2008) both of which are hereby incorporated by reference in their entirety.

TECHNICAL FIELD

The present invention relates to a physical quantity measuring device and a physical quantity measuring method. More specifically, the invention relates to a physical quantity measuring device and a physical quantity measuring method for rapidly and highly accurately estimating an offset included in a vector physical quantity data, according to situations, from the vector physical quantity data obtained by a sensor that detects a vector physical quantity.

BACKGROUND ART

An azimuth measuring device (so-called electronic compass) is known in which magnetic sensors are arranged along two or three directions, geomagnetism is measured and an azimuth is calculated. In recent years, the azimuth measuring device has become increasingly smaller and is incorporated into a portable device such as a mobile telephone or a PDA (Personal Digital Assistant).

When a magnetized component such as a speaker is disposed near the magnetic sensor, the azimuth measuring device detects magnetism leaked from the magnetized component together with the geomagnetism. Thus, an azimuth is erroneously calculated unless an azimuth is determined after a signal component due to other than geomagnetism is subtracted from a measured signal. A stationary signal component due to other than geomagnetism is referred to as an offset.

A method of estimating an offset of an azimuth measuring device that is suitable for a portable device is disclosed in patent literature 1, patent literature 2 and the like. The method disclosed in patent literature 1 and 2 is a technique for estimating the offset of the azimuth measuring device incorporated in the portable device automatically and unconsciously by the user by taking advantage of the fact that the posture of the portable device is variously changed depending on the use situation of a user.

FIG. 17 is a diagram illustrating the concept of a method of estimating an offset in a conventional azimuth measuring device.

When a user freely moves an azimuth measuring device 1 under a uniform geomagnetism circumstance, geomagnetic data obtained by the azimuth measuring device 1 is distributed on the surface of a sphere in which an offset included in the data is located at the center position of the sphere. The sensitivities of measurement axes of the azimuth measuring device 1 are considered to be equal to each other.

In the present application, as described above, a component other than a vector physical quantity (for example, geomagnetism) that is included in data and that is to be measured is referred to as an offset. First, in order to estimate an offset, the center of a spherical surface (when the geomagnetism is detected by using a three-axis geomagnetic sensor) on which geomagnetic data are distributed is estimated. The center of the spherical surface is referred to as a reference point. Next, the reliability of the estimated reference point (whether the reference point is estimated within an estimation error which is allowed by a system) is examined, and thus the reference point determined to be reliable is adopted as the offset of the system. When the reliability of the reference point is not determined, the reference point is directly used as the offset of the system.

According to patent literature 1, when a three-axis measurement data obtained repeatedly by the azimuth measuring device 1 is defined as $(x_i, y_i, z_i)$, it is suitable to estimate a reference point $(o_x, o_y, o_z)$ so as to minimize an evaluation formula [Formula 1]. Here, the reference point is determined by the solution of a simultaneous linear equation shown as [Formula 2]. That is, $$S = \sum_{i=1}^{N} \|(x_i - o_x)^2 - (y_i - o_y)^2 + (z_i - o_z)^2 - r^2\|^2 \quad \text{[Formula 1]}$$

$$\begin{bmatrix} \sum_{i=1}^{N} x_i(x_i - \bar{x}) & \sum_{i=1}^{N} y_i(x_i - \bar{x}) & \sum_{i=1}^{N} z_i(x_i - \bar{x}) \\ \sum_{i=1}^{N} y_i(x_i - \bar{x}) & \sum_{i=1}^{N} y_i(y_i - \bar{y}) & \sum_{i=1}^{N} z_i(y_i - \bar{y}) \\ \sum_{i=1}^{N} z_i(x_i - \bar{x}) & \sum_{i=1}^{N} z_i(y_i - \bar{y}) & \sum_{i=1}^{N} z_i(z_i - \bar{z}) \end{bmatrix} \begin{bmatrix} o_x \\ o_y \\ o_z \end{bmatrix} = \quad \text{[Formula 2]}$$

$$\frac{1}{2} = \begin{bmatrix} \sum_{i=1}^{N} (x_i^2 + y_i^2 + z_i^2)(x_i - \bar{x}) \\ \sum_{i=1}^{N} (x_i^2 + y_i^2 + z_i^2)(y_i - \bar{y}) \\ \sum_{i=1}^{N} (x_i^2 + y_i^2 + z_i^2)(z_i - \bar{z}) \end{bmatrix}$$

Where, $$\bar{x} = \frac{1}{N}\sum_{i=1}^{N} x_i, \quad \bar{y} = \frac{1}{N}\sum_{i=1}^{N} y_i, \quad \bar{z} = \frac{1}{N}\sum_{i=1}^{N} z_i \quad \text{[Formula 3]}$$

and, N is the number of geomagnetic data obtained.

Another method of determining an offset of a sensor is disclosed in patent literature 8. According to patent literature 8, among three or more magnetic data detected by a magnetism detection unit, an intersection between a perpendicular bisector to a straight line connecting any two points and a perpendicular bisector to a straight line connecting two points different from the above-described two points is determined as an offset.

Moreover, a large number of any two points are extracted from a plurality of magnetic data, a large number of perpendicular bisectors are set for respective straight lines connecting the two points, and the average of coordinates of a plurality of intersections at which the large number of perpendicular bisectors intersect each other is determined as an offset.

In recent years, as a lightweight and small three-axis acceleration sensor that can be incorporated into a portable device, a piezoresistive three-axis acceleration sensor comprised of a semiconductor device employing MEMS (Micro Electro Mechanical Systems) technology has been developed (for example, see patent literature 7).

The acceleration sensor detects dynamic acceleration and motion acceleration. When movement is involved, the acceleration sensor can detect not only gravitational acceleration but also dynamic acceleration whereas, in a stationary state, it can detect only gravitational acceleration. The angle of inclination of the acceleration sensor can be calculated from a three-axis acceleration output of the acceleration sensor in a stationary state, and, based on this, as an application, the posture angle of a portable device incorporating the acceleration sensor is determined.

In order to determine the angle of inclination of the acceleration sensor, it is necessary to determine the value of gravitational acceleration that is applied to each axis of the acceleration sensor. Hence, it is necessary to calculate the offset of the acceleration sensor and correct it. The offset of the acceleration sensor is determined by an operation for, for example, the outgoing inspection of the factory of the acceleration sensor, the outgoing inspection of the factory of a portable device and the estimation of an offset by the user.

Patent literature 5 and 6 disclose methods for automatically and unconsciously by the user estimating the offset of an acceleration sensor. Any of these methods is a technique based on [Formula 2] and is a technique that estimates the offset with high degree of reliability by utilizing characteristic unique to acceleration.

As in the azimuth measuring device of FIG. 17, gravitational acceleration measurement data detected by the three-axis acceleration sensor is distributed on the surface of a sphere in which the offset of the acceleration sensor is located at the center position thereof. The sensitivities of measurement axes of the acceleration sensor are assumed to be equal to each other.

Since the acceleration sensor detects gravitational acceleration and motion acceleration simultaneously, the separation of the gravitational acceleration from the motion acceleration is a technical point for determining an offset with high reliability.

In patent literature 5, whether a portable terminal becomes stationary is determined from acceleration measurement data that is continuous over time, and an offset is estimated by use of only the acceleration measurement data at that time.

In patent literature 6, the probability that motion acceleration is included in the acceleration measurement data is calculated by using variations in acceleration measurement data that is continuous over time. Thus, an offset can also be estimated from measurement data including motion acceleration.

CITATION LIST

Patent Literature

PTL 1: International Publication No. WO2004/003476
PTL 2: International Publication No. WO2005/003683
PTL 3: International Publication No. WO2005/061990
PTL 4: Japanese Patent Laid-Open No. 2005-195376
PTL 5: International Publication No. WO2006/016671
PTL 6: International Publication No. WO2007/077859
PTL 7: Japanese Patent Publication No. 3985215
PTL 8: Japanese Patent Laid-Open No. 2006-226810

SUMMARY OF INVENTION

The above-described [Formula 2] is a formula for estimating an offset included in the geomagnetic data by using a geomagnetic data obtained in a space in which the magnitude of the geomagnetism is uniform.

However, there are few circumstances in which the magnitude of the geomagnetism is uniform.

FIG. 18 is a diagram showing a result of measuring the magnitude of the geomagnetism, the dip of the geomagnetism and a walking azimuth (a geomagnetic azimuth) while walking straight in an urban area.

Since the walking speed is approximately one meter per second when the data shown in FIG. 18 is obtained, the unit of the horizontal axis is considered to be approximately m (meter). It is found that the geomagnetism varies depending on the location. A magnetic substance such as iron included in a building draws the geomagnetism, and thus the geomagnetism is not generally uniform around an artificial building.

For this reason, even if geomagnetic measurement data obtained by an azimuth measuring device is randomly extracted and an offset contains [Formula 2], accurate values are not necessarily obtained.

When the method disclosed in patent literature 8 is used for determining an offset from an intersection between perpendicular bisectors, if at least two magnetic data for setting individual perpendicular bisectors are obtained at locations where the magnitude of the geomagnetism is the same, the offset of a sensor can be determined even if the magnitude of the geomagnetism observed at locations where all the magnetic data is acquired is not equal to each other. However, the method disclosed in patent literature 8 is not suitable for determining an offset from magnetic data containing noise obtained at the time of actual walking (the reason thereof will be described later).

In combination with [Formula 2], techniques for estimating an offset with high reliability are disclosed in patent literature 1, 2 and 3. In patent literature 1, for example, the difference between the maximum value and the minimum value of each axial component of a measurement data that are used for estimation with [Formula 2] is calculated, and the estimated reference point is used as the offset if the difference is equal to or more than a predetermined value. Even when data are obtained at a location where the magnitude of the geomagnetism is different, the accuracy of the estimated reference point can be improved on situation that the data are distributed over a wide region.

The difference (i.e. variation) between the maximum value and the minimum value of each axial component of a reference point group that is periodically estimated is calculated, and the estimated reference point is used as the offset when the difference is not more than a predetermined value. When a variation in the estimated reference point is small, the measurement data used for estimation are highly likely to be obtained under a uniform geomagnetism circumstance, and the reliability of the estimated reference point is considered to be high.

For the variation, an index that can express data distribution is preferably used; it is possible to use, for example, a difference between the maximum value and the minimum value of each axial component of the magnetic data or the standard deviate of measurements of the individual axes and the like.

In patent literature 3, the measurement data used for estimation are applied to a plane, the distance between the plane and the measurement data are calculated. The estimated reference point is used as the offset when the maximum value of the distance is equal to or more than a predetermined value.

Patent literature 2 discloses a method in which the predetermined value is periodically set tight (for example, every time an offset is obtained a predetermined number of times) (is changed to a predetermined value for obtaining a more reliable offset), or the predetermined value is set loose (is changed to a predetermined value for obtaining an offset faster) when a specific event occurs (for example, every time a magnetic substance component such as a memory card is attached on a portable terminal). Thus, the reliability is low immediately after a portable device is operated but an offset is estimated rapidly and then the reliability of the offset is gradually improved.

FIG. 19 is a block diagram showing the configuration of an offset estimation means 300 of prior art.

The offset estimation means 300 selects and stores data obtained by a datum acquisition means 301 by a data selection portion 302 as required. A reference point estimation portion 304 estimates a reference point included in data output by the datum acquisition means 301 based on an evaluation formula 303 previously determined from the stored data, a reliability determination portion 305 checks the reliability of the estimated reference point (patent literature 1, 2 and 3) and only the reference point determined to be reliable is output as an offset. A criterion for evaluation (hereinafter, a determination value) for checking the reliability of the estimated reference point is managed by an offset estimation parameter management 306, and is changed according to the situation.

The determination value does not necessarily indicate one value. For example, if, based on the reference point determined from [Formula 2] described above, the geomagnetic data used for the estimation are data obtained from a space having uniform geomagnetism, it is possible to determine the magnitude (r) of the geomagnetism from [Formula 4]. The range of r can be somewhat limited by a geographical location where the geomagnetic data is obtained. For example, since, in Japan, about 45 uT is a typical value, if the calculated value of r exists within, for example, a range of 30 uT to 60 uT, the reliability of the reference point is considered to be high whereas if it exists outside the range, it is considered not to be reliable, and the reference point is discarded. As described above, the upper limit and the lower limit may be referred to as the determination value.

$$r^2 = \frac{1}{N}\sum_{i=1}^{N}((x_i - o_x)^2 + (y_i - o_y)^2 + (z_i - o_z)^2)$$ [Formula 4]

The reason why the determination value is changed according to the situation will be described using an example disclosed in patent literature 2. When the offset of a geomagnetic sensor incorporated in an azimuth measuring device is estimated, variations in the estimated reference points are calculated, and, only if the result is equal to or less than a predetermined value (determination value), the estimated reference points are employed as the offset. However, preferably, this determination value is dynamically changed according to the situation.

A reference point estimated by using only data obtained in a uniform magnetic circumstance and a reference point estimated by using only data distributed on a wide solid angle have small errors in general (a reference point close to a true offset is required). On the other hand, when the magnetic field is not uniform or when the solid angle on which the obtained data is distributed is small, the estimated reference point tends to have a large error, and thus continuously estimated reference points tend to vary greatly.

Hence, if a determination value for the variations is set loose, an offset having a large error may be calculated. However, since the offset is easily updated, even if the magnetized state of the azimuth measuring device is changed and the offset is greatly changed, it is advantageously corrected soon.

On the other hand, if the determination value is tight, the offset is rarely updated but a highly reliable (close to the true offset) offset is required.

When the employment and the discarding of the reference point is determined by constantly using one determination value, since it is difficult to simultaneously satisfy a plurality of specifications such as a response speed and accuracy required for the azimuth measuring device, it is preferable to dynamically change the determination value according to the situation, that is, according to whether it is important to rapidly estimate the offset or it is important to estimate a highly accurate offset as compared with a time period required for the estimation.

The offset estimation parameter management portion 306 manages measurement parameters, calculation parameters (both of which will be described later) and the determination value (those three are collectively referred to as an offset estimation parameter), and changes the offset estimation parameter according to situations detected by an event detection means.

The data selection portion 302 selects and stores data suitable for the estimation of a highly reliable reference point. In order for a highly reliable reference point to be estimated, data that is somewhat distributed on a wide solid angle is required. Hence, for example, until the data selection portion obtains data which is a predetermined value (the shortest data distance) or more away from data that has been most recently selected, the data selection portion does not store new data.

The measurement parameters include, for example, a frequency at which the datum acquisition means obtains data, the number of data that are stored in the data selection portion and that are thus used for the estimation of the reference point and the shortest data distance described above.

The calculation parameters include the number of reference points that are used when variations in the reference point are calculated.

However, the conventional method described above is predicated on [Formula 2], which is derived on the assumption that geomagnetism is uniform, and, depending on data used for the estimation (in a case where data obtained in circumstances of different-sized geomagnetism are present), a reference point with a low accuracy may be erroneously employed. When the predetermined value is set too tight so as not to erroneously employ a reference point with a low accuracy, it takes an extremely long period of time to obtain the offset. In general, it is very difficult to set the offset estimation parameters that satisfy a plurality of specifications (such as the average accuracy of required offsets and a time period until the acquisition of the offset) required by a system utilizing the azimuth measuring device.

Since the gravitational acceleration varies little even when the location is changed, a highly accurate offset can be obtained from [Formula 2] when pure gravitational acceleration data excluding motion acceleration is obtained.

As disclosed in patent literature 5, the measurement data excluding motion acceleration can be obtained by determining whether a motion of a portable device is stationary. For example, if a variation in each measurement axis of acceleration measurement data obtained during a predetermined period of time T is not more than a predetermined range TH, the portable device can be determined to be stationary. When the period T makes longer and the range TH makes smaller, the probability that motion acceleration included in the measurement data is decreased, but it takes long time until stationary data is obtained (therefore, it takes a longtime to obtain the offset). When the period T and the range TH are set loose so that time is shorten until an offset is estimated, the obtained stationary data may include motion acceleration, and the reliability of the offset estimated from such data is generally low.

Even when a user of a portable terminal does not move the terminal, erroneous gravitational acceleration data may be obtained. For example, an elevator accelerates or decelerates at a constant acceleration of about 0.1 G ($\approx 1$ m/s$^2$). As technique is advanced, a vibration during an upward or downward movement is eliminated. Thus, it is likely that a stationary acceleration sensor within an elevator receives a constant acceleration of about 1.1 G or 0.9 G, and it often satisfies a stationary judgment criterion mentioned above.

When a portable terminal is accidentally dropped, the acceleration of the portable terminal becomes about 0 G (although it depends on the degree of the rotational movement of the portable terminal). During free fall, the stationary judgment criterion mentioned above is often satisfied.

As described above, the methods of determining the offset of the acceleration sensor in the circumstance of users are conventionally used with technologies disclosed in patent literature 5 and 6. However, since, in any of these methods, it is impossible to determine whether or not the reference point is estimated by only gravitational acceleration, the reliability of the offset may be properly estimated.

Therefore, an object of the present invention is to provide a physical quantity measuring device and a physical quantity measuring method that can rapidly or highly accurately estimate a highly reliable offset according to situations even if a measurement data are not obtained in a space in which the magnitude of a vector physical quantity to be measured is uniform.

It is another object of the present invention to provide a physical quantity measuring device and a physical quantity measuring method that can further enhance the reliability of an estimated offset.

According to the present invention, there is provided a physical quantity measuring device for measuring a physical quantity, including: a vector physical quantity detection means for detecting a vector physical quantity composed of a plurality of components; a datum acquisition means for repeatedly obtaining the detected vector physical quantity as vector physical quantity datum to obtain a vector physical quantity data; and an offset estimation means for calculating difference vectors from the obtained vector physical quantity data and statistically estimating an offset included in the obtained vector physical quantity data based on a predetermined evaluation formula using the calculated difference vectors, in which the offset estimation means includes: a difference vector calculating portion for calculating the difference vectors using a difference between each component of the obtained vector physical quantity data; a data selection portion that selects and stores the difference vectors based on a predetermined measurement parameter; a reference point estimation portion that statistically estimates, based on the evaluation formula using the selected difference vectors, coordinates of a reference point on a coordinate system where each component of the obtained vector physical quantity data is a coordinate value; and a reliability determination portion that calculates reliability information on the reference point based on at least one of the vector physical quantity data, the difference vectors and a plurality of the estimated reference points according to a calculation parameter for calculating the reliability information on the reference point, that compares the reliability information with a determination threshold value to determine a degree of reliability of the reference point and that outputs the determined reference point having the desired reliability as an offset included in the vector physical quantity datum obtained by the datum acquisition means.

The offset estimation means may include an offset estimation parameter management portion that manages, as an offset estimation parameter, the determination threshold value, the measurement parameter and calculation parameter, and the offset estimation parameter management portion may change the offset estimation parameter based on at least one of the reliability information calculated by the reliability determination portion, the determined degree of reliability, a number of times that the desired reliability is determined and a time during which the same offset estimation parameter is used The physical quantity measuring device further includes an event detection means for detecting the change of a circumstance inside and outside the physical quantity measuring device or an operation of an operator, and, when the event occurs, the offset estimation parameter may be changed.

The change of circumstance may be a change of temperature.

When the data obtained by the datum acquisition means exceeds a predetermined range, it is determined that the circumstance has changed, and the offset estimation parameter may be changed.

The evaluation formula may be determined using an N-th power of an absolute value of an inner product of the difference vector and a vector connecting a middle point of the difference vector and the reference point.

The N may be two or four.

The measurement parameter may include a time interval at which the vector physical quantity detection means detects the physical quantity or a time interval at which the datum acquisition means obtains the vector physical quantity.

The measurement parameter may include an amount of change of data, the amount of change may be a difference between the vector physical quantity data obtained by the datum acquisition means and the data selected by the data selection portion, and the data selection portion may select data in which the amount of change is not less than a predetermined value.

The measurement parameter may include the number of vector physical quantity data to estimate the reference point by the offset estimation means.

The measurement parameter may include a time difference when two vector physical quantity data constituting the difference vector are obtained, and the data selection portion may select only a difference vector in which the time difference is not more than a predetermined value.

The measurement parameter may include the magnitude of a difference vector, and the data selection portion may select only a difference vector in which the magnitude of the difference vector is not less than a predetermined value.

The measurement parameter may include an angle formed by two difference vectors, and the data selection portion may select only a difference vector in which an angle between a newly calculated difference vector and an already selected difference vector is not less than a predetermined value.

The reliability information may include angle information calculated from the difference vectors used for estimating the coordinates of the reference point, the angle information may be information that is calculated from an angle between each of difference vectors of the difference vectors used for estimating the coordinates of the reference point and a vector connecting a middle point of the difference vector and the estimated reference point, and, when the angle of all the difference vectors of the difference vectors used for estimating the coordinates of the reference point exists within a predetermined range, the reliability determination portion may determine that the reference point has the desired reliability.

The reliability information may include distance information calculated from the difference vectors used for estimating the coordinates of the reference point, the distance information may be information that is calculated from a distance between a foot of a perpendicular line drawn from the estimated reference point to each of the difference vectors used for estimating the coordinates of the reference point and the middle point of the difference vector, and, when the maximum value of the distance calculated from the difference vectors used for estimating the coordinates of the reference point is not more than a predetermined value, the reliability determination portion may determine that the reference point has the desired reliability.

When the vector physical quantity detection means is a two-component vector physical quantity detection means, the reliability information may include distance information calculated from the difference vectors used for estimating the coordinates of the reference point, the distance information may be information that is calculated form a distance between a perpendicular bisector of each of the difference vectors and the estimated reference point, and, when a maximum value of the distance calculated from the difference vectors used for estimating the coordinates of the reference point is not more than a predetermined value, the reliability determination portion may determine that the reference point has the desired reliability.

When the vector physical quantity detection means is a three-component vector physical quantity detection means, the reliability information may include distance information calculated from the difference vectors used for estimating the coordinates of the reference point, the distance information may be information that is calculated form a distance between a perpendicular bisector plane of each of the difference vectors and the estimated reference point, and, when a maximum value of the distance calculated from the difference vectors used for estimating the coordinates of the reference point is not more than a predetermined value, the reliability determination portion may determine that the reference point has the desired reliability.

The reliability information may include information calculated from a variation of predetermined M reference points among the reference points, and when the variation is not more than a predetermined value, the reference points may be determined to have the desired reliability.

The reliability information may include information calculated from a variation of individual axial components of data constituting data used for estimating the reference point, and when the variation is not more than a predetermined value, the reference points may be determined to have the desired reliability.

The reliability information may include a distance between datum of the data used for estimating the reference point and the reference point, and when the distance between datum of the data used for estimating the reference point and the reference point exists within a predetermined range, the reference points may be determined to have the desired reliability.

The reliability information may include information calculated from a distance between datum of the data and a plane which is determined on a coordinate axis where each component of physical quantity data is a coordinate component such that a sum of distances between the plane and datum of the data used for estimating the reference point is minimized, and when the maximum value of the distance from the plane calculated from the data used for estimating the reference point is not less than a predetermined value, the reference points may be determined to have the desired reliability.

The reliability information may include information calculated from a time difference between a time when data is first obtained from the data used for estimating the reference point and a time when data is last obtained, and when the time difference is not more than a predetermined value, the reference points may be determined to have the desired reliability.

The calculation parameter may include the number M of reference points used for calculating a variation in the reference points.

The state of the offset estimation parameter used for estimating the offset may be output to the outside.

The reliability information may be output. The degree of reliability may also be output. Alternatively, both of the reliability information and the degree of reliability may be output.

The vector physical quantity detection means may be a magnetic sensor that detects magnetism as the physical quantity.

The vector physical quantity detection means may be an acceleration sensor that detects acceleration as the physical quantity.

According to the present invention, there is provided a physical quantity measuring method of measuring a physical quantity, comprising steps of: detecting a vector physical quantity composed of a plurality of components; repeatedly obtaining the detected vector physical quantity as vector physical quantity data to obtain a vector physical quantity data; and calculating a difference vectors from the obtained vector physical quantity data and statistically estimating an offset included in the obtained vector physical quantity data based on a predetermined evaluation formula using the calculated difference vectors, wherein the step of estimating the offset comprises the steps of: calculating the difference vectors using a difference between each component of the obtained vector physical quantity data; selecting and storing the difference vectors based on a predetermined measurement parameter; statistically estimating, based on the evaluation formula using the selected difference vectors, coordinates of a reference point on a coordinate system where each component of the obtained vector physical quantity data is a coordinate value; and calculating reliability information on the reference point based on at least one of the vector physical quantity data, the difference vectors and a plurality of the estimated reference points according to a calculation parameter for calculating the reliability information on the reference point, comparing the reliability information with a determination threshold value to determine reliability of the reference point and outputting the determined reference point having the desired reliability as an offset included in the vector physical quantity data obtained in the data obtaining step.

BRIEF DESCRIPTION OF DRAWINGS

FIG. 5 is a diagram showing a table of offset estimation parameters used;

FIG. 7A is a diagram that illustrates a relationship between a difference vector utilized for estimation of a reference point, noise included in measurement data and an offset, showing an example that a magnitude of the difference vector is large;

FIG. 7B is a diagram that illustrates the relationship between the difference vector utilized for estimation of the reference point, noise included in the measurement data and the offset, showing an example that a magnitude of the difference vector is small;

FIG. 8A is a diagram that illustrates a relationship between the difference vector utilized for estimation of the reference point, a time difference in the acquisition of measurement data for the difference vector and an offset, showing an example that the time difference is small;

FIG. 8B is a diagram that illustrates the relationship between the difference vector utilized for estimation of the reference point, the time difference in the acquisition of the measurement data for the difference vector and the offset, showing an example that the time difference is large;

DESCRIPTION OF EMBODIMENTS

Embodiments of the present invention will be described in detail below with reference to the accompanying drawings.

First Example

Figure 1:
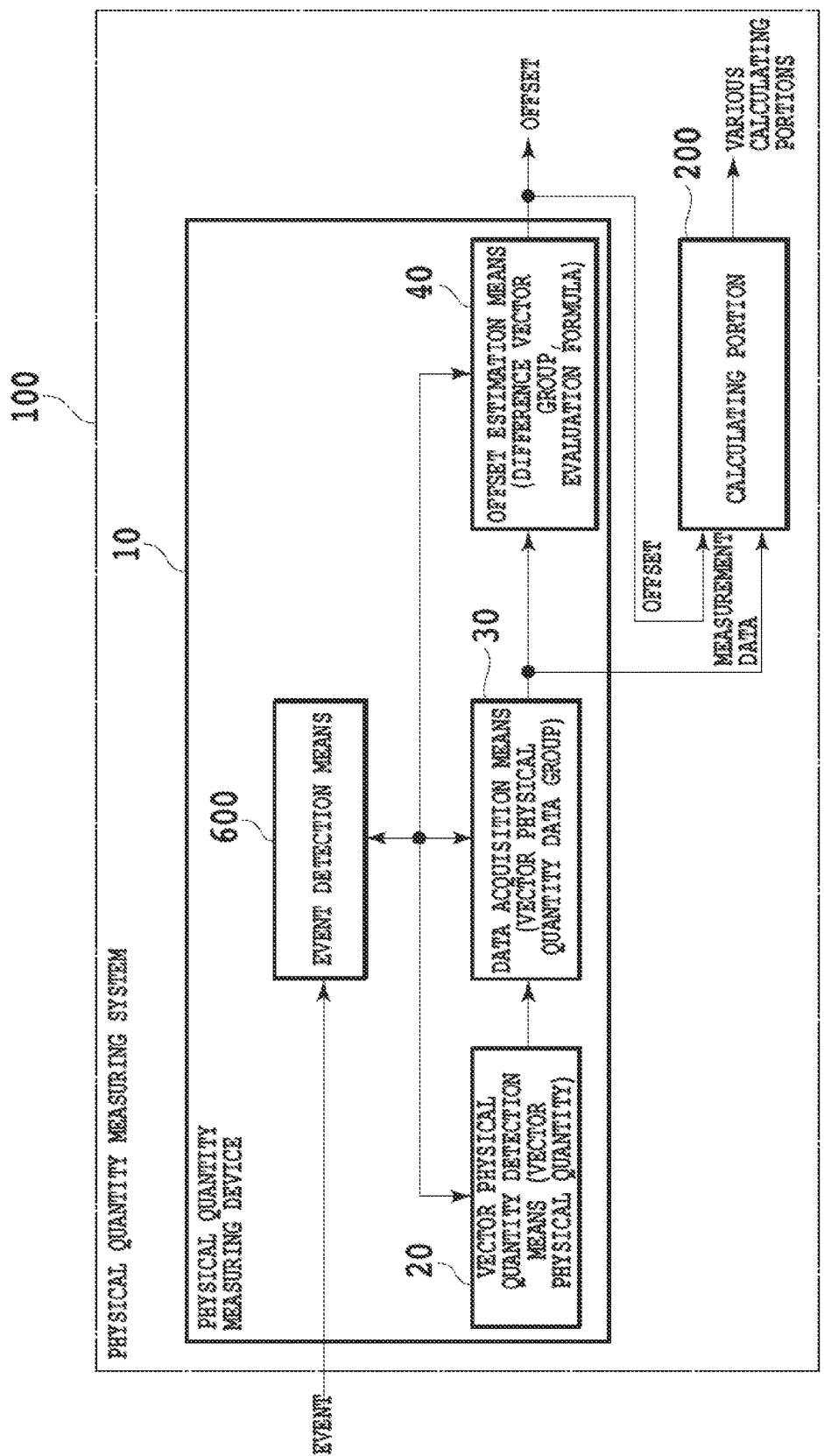
FIG. 1 is a block diagram schematically showing the overall configuration of a physical quantity measuring system according to a first embodiment of the present invention.

The first example of the present invention will be described based on FIGS. 1 to 14.
<Configuration>
FIG. 1 schematically shows the overall configuration of a physical quantity measuring system 100.

The physical quantity measuring system 100 includes a physical quantity measuring device 10 and a calculating portion 200.

The physical quantity measuring device 10 includes a vector physical quantity detection means 20, a datum acquisition means 30, an offset estimation means 40 and an event detection means 600.

The vector physical quantity detection means 20 detects a vector physical quantity composed of a plurality of components.

The datum acquisition means 30 repeatedly obtains the detected vector physical quantity as vector physical quantity data to make up vector physical quantity data.

The offset estimation means 40 calculates difference vectors from the obtained vector physical quantity data, estimates, based on a predetermined evaluation formula using the calculated difference vectors, a reference point included in the vector physical quantity data, determines the reliability of the estimated reference point and outputs, as an offset, a reference point that is determined to be highly reliable.

The event detection means 600 detects changes of various situations inside and outside the physical quantity measuring device; the physical quantity measuring device 10 receives the changes of the situations to change the behavior (change the offset estimation parameters).

The calculating portion 200 calculates information necessary for the system based on the vector physical quantity data obtained by the physical quantity measuring device 10 and the estimated offset.

Figure 2:
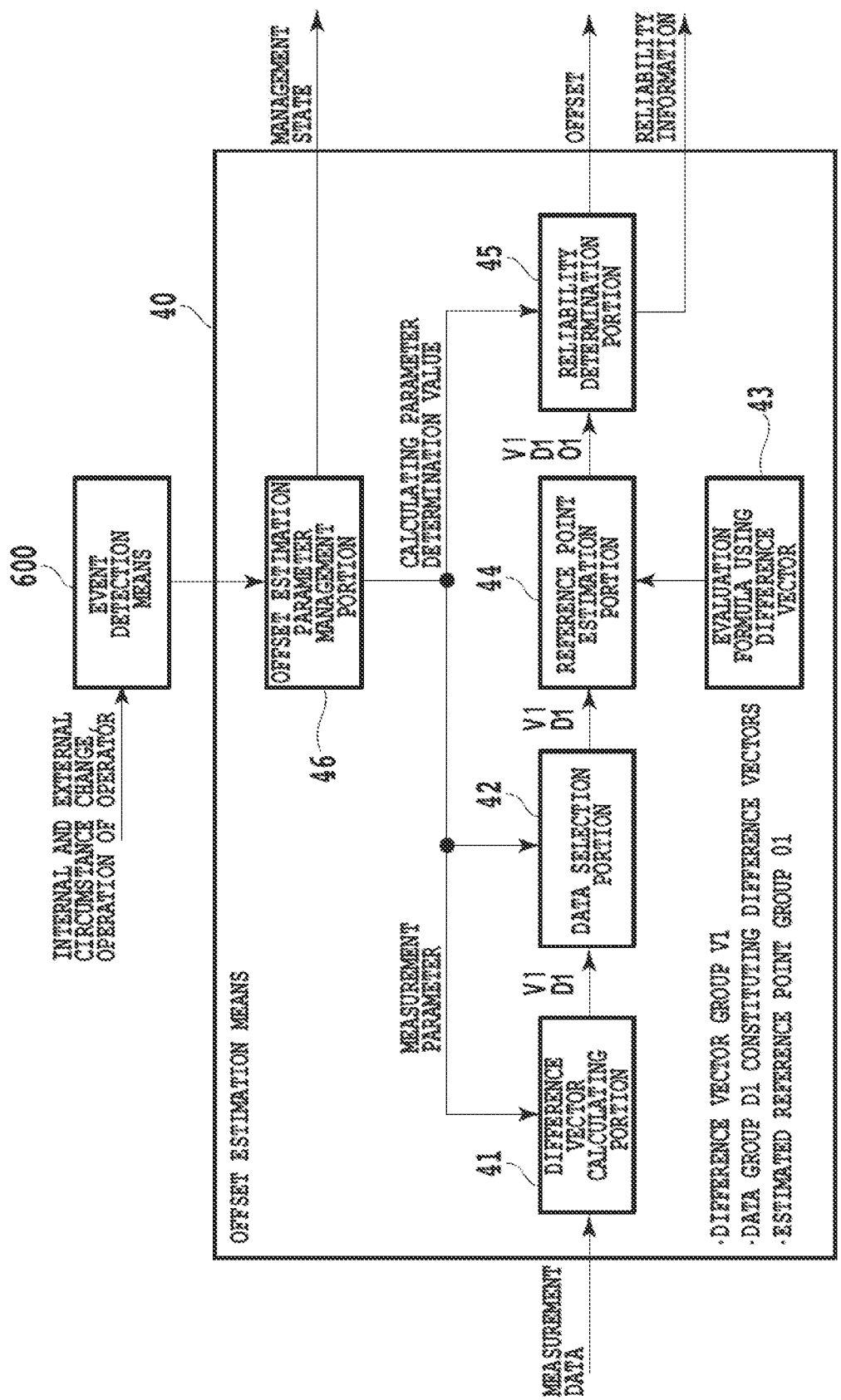
FIG. 2 is a block diagram showing a configuration example of an offset estimation means.

FIG. 2 shows an example of the configuration of the offset estimation means 40.

The offset estimation means 40 includes a reference vector calculating portion 41, a data selection portion 42, a reference point estimation portion 44, a reliability determination portion 45 and an offset estimation parameter management portion 46.

The difference vector calculating portion 41 calculates difference vectors (V1) from differences between the components of the obtained vector physical quantity data.

The data selection portion 42 determines whether or not the difference vector and data constituting the difference vector are data suitable for the estimation of the reference point, and stores the difference vector and data constituting the difference vector that are determined to be suitable.

Based on an evaluation formula 43 using the calculated difference vectors (V1), the reference point estimation portion 44 statistically estimates the coordinates of a reference point determined on a predetermined coordinate system where the individual components of the acquired vector physical quantity data are coordinate values.

The reliability determination portion 45 determines the reliability of the reference point estimated in the reference point estimation portion 44, and outputs the offset of the reference point that is determined to be highly reliable. As the method of determining the reliability of the reference point, various methods can probably be used; one way to do it is to calculate the reliability information on the reference point according to the calculation parameter, which will be described later, compare the reliability information with the determination value and use the result as an index. The number of determination values may be one; the reliability may be divided into a plurality of sections based on a plurality of determination values. In this case, it is possible that, only when the most reliable section is determined, the offset is output. It is not necessarily true; for example, when the reliability is determined using four sections that are excellent, good, satisfactory and unsatisfactory, the output of the offset may facilitate the convenience of a user even if the reliability is good or satisfactory.

The offset estimation parameter management portion 46 manages various parameters on the offset estimation. The offset estimation parameter management portion 46 changes various parameters on the offset estimation based on the state of the offset estimation means and the change of an event detected by the event detection means 600, and thereby manages the entire behavior of the offset estimation means 40 so as to estimate the optimum offset according to the situations. As shown in FIG. 5, in the offset estimation parameter, the measurement parameter, the determination value and the calculation parameter may be prepared in a table on an individual level basis; the offset estimation parameter management portion 46 may select one level from a plurality of levels according to the situations; and the behavior of the physical quantity measuring device may be managed with the offset estimation parameter indicated by the selected level. Alternatively, the offset estimation parameter management portion 46 may continuously change various items of the offset estimation parameter according to the situations.

The event detection means 600 is not particularly shown; it detects various events that can affect the reliability of the offset. For example, based on the state of the interior of the physical quantity measuring device 10 or the data detected and acquired by the physical quantity measuring device 10, the event detection means 600 detects various events that can affect the reliability of the offset, and detects events, such as a value detected by a sensor provided outside the physical quantity measuring device 10 and an operation of a system incorporated in the physical quantity measuring device 10 by an operator, that can affect the reliability of the offset of the physical quantity measuring device. Needless to say, the events that are detected and the method of detecting them are not limited to the above example.

The offset estimation parameter management portion may output the status of the management of the offset estimation parameter that is currently used. The reliability determination portion may output the reliability information or the reliability level. The reliability determination portion may output both the reliability information and the reliability level.

A specific configuration example of each portion will be described below.

The vector physical quantity detection means 20 detects a physical quantity composed of two components or three components, and outputs a signal corresponding to the detected physical quantity. The physical quantity as a measurement object, for example, includes the geomagnetism and acceleration.

As a configuration of the vector physical quantity detection means 20, for example, a magnetic sensor that detects magnetism and outputs a voltage proportional to the detected magnetism, an acceleration sensor that detects acceleration and outputs a voltage proportional to the detected acceleration or the like can be used.

The datum acquisition means 30 converts the signal output by the vector physical quantity detection means 20 into an output signal that is easily processed by latter blocks (the blocks after the offset estimation means 40).

The datum acquisition means 30, for example, amplifies a signal output by the vector physical quantity detection means, converts the amplified signal to a digital signal by A/D conversion form, and outputs the converted digital signal as a digital data. Further, a filtering process may be performed for eliminating noise at the same time of the amplifying process.

Generally, since a sensor represented by a magnetic sensor or an acceleration sensor outputs an extremely weak signal with small level of amplitude, the signal is amplified and filtered to improve S/N (Signal to Noise), and then converted into digital data for easy processing by a computer or the like, to be output. Alternatively, the detected signal may be processed as the analog signal without A/D conversion, and latter processing may be performed by using the analog signal. The filter processing may be performed on the digital data resulting from the A/D conversion. As a digital filter for removing high-pass noise, for example, averaging processing is taken up as an example.

<Operation>

The operation of this system will be described below.

(An Outline of the Measurement of a Physical Quantity)

Figure 3:
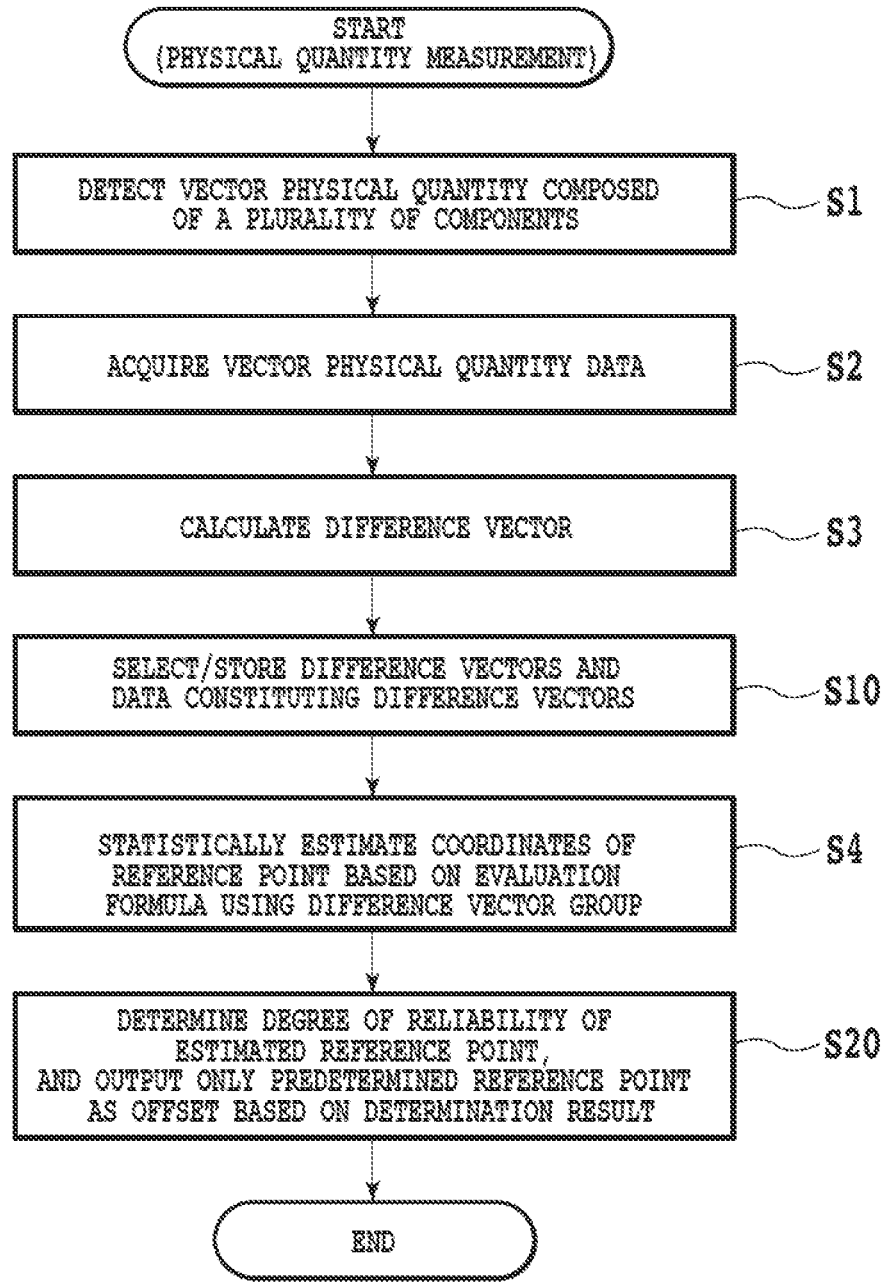
FIG. 3 is a flowchart showing an outline of the measurement of a physical quantity in a physical quantity measuring device.

FIG. 3 is a flowchart showing an outline of the measurement of a physical quantity in the physical quantity measuring device 10.

In step S1, the vector physical quantity comprised of a plurality of components is detected.

In step S2, the detected vector physical quantity is converted into a form in which it is easily processed by individual blocks in the subsequent stages (after the offset estimation means 40) and is acquired.

In step S3, a difference of each component of the obtained vector physical quantity data are calculated, and thus the difference vectors are obtained.

In step S4, based on the evaluation formula that uses the difference vectors, a coordinate of the reference point set on a coordinate system constituted of each component of the obtained vector physical quantity data are statistically estimated. Thus, the coordinate of the estimated reference point are output as an offset.

(Outline of the Management of the Offset Estimation Parameter)

Figure 4:
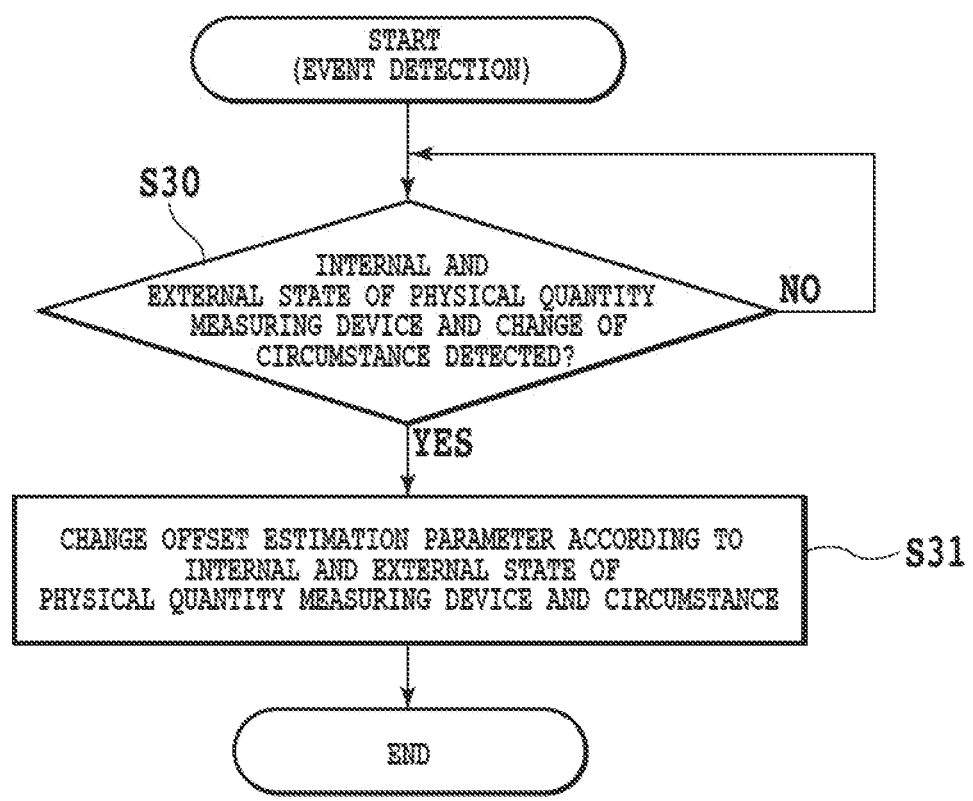
FIG. 4 is a flowchart showing an outline of the detection of an event in a physical quantity measuring device.

FIG. 4 is a flowchart showing an outline of the management of the offset estimation parameter in the physical quantity measuring device 10.

If, in step S30, the change of the state of the interior of the physical quantity measuring device 10 and the change of the measurement circumstance are detected, in step S31, the offset estimation parameter is changed according to the state of the interior of the physical quantity measuring device 10 and the measurement circumstance.

A specific example of the measurement of a physical quantity will be described below.

(Estimation of the Reference Point)

In the offset estimation means 40 in FIG. 2, the difference vector is calculated from two of the measurement data obtained by the datum acquisition means 30 or two data calculated from the measurement data. Then, as required, the difference vector and data comprised of the difference vector are stored. A reference point of measurement data obtained by the datum acquisition means are estimated based on a predetermined evaluation formula by the stored difference vectors and the data comprised of the difference vector. Thus, the estimated reference point is output as an offset.

As described later, it becomes possible to estimate an offset from data obtained under the circumstance that the magnitude of vector physical quantity is not uniform by using the evaluation formula which uses difference vector.

Two data comprised of the difference vector may be configured by data that obtained by the datum acquisition means, or may be configured by values that obtained by performing a calculation (for example, averaging) on the measurement data so as to reduce an effect of noise.

(Computation Processing)

In the physical quantity measuring system 100 shown in FIG. 1, the calculating portion 200 receives the measurement data obtained from the datum acquisition means 30 and the offset estimated by the offset estimation means 40 of the physical quantity measuring device 10. Thus, information necessary for the system is calculated.

For example, the physical quantity detection means is a three-axis magnetic sensor and an azimuth measuring device detects the geomagnetism to calculate an azimuth. Using the estimated offset and the obtained measurement data, the value of the geomagnetism is calculated, and the azimuth is calculated.

Specifically, the estimated offset is set to as $(o_x, o_y, O_z)$. Magnetic measurement data is set to as $m=(x_i, y_i, z_i)$ when a portable device incorporating the physical quantity measuring system 100 of the present invention is horizontally placed (the x-measurement axis and the y-measurement axis of the magnetic sensor are on the horizontal plane). Thus, the azimuth of x-measurement axis to the magnetic north is calculated by the following formula.

$$\theta = \tan^{-1}\left(\frac{-m_y - o_y}{m_x - o_x}\right) \quad \text{[Formula 5]}$$

It is exampled that the physical quantity detection means 20 is a three-axis acceleration sensor and an inclination angle measuring device calculates the inclination to the horizontal plane of the portable device. In this case, the value of the gravitational acceleration is calculated from the estimated offset and the obtained data. Then, the inclination angle of the portable device is calculated.

Specifically, the estimated offset is set to $(o_x, o_y, o_z)$, and gravitational acceleration measurement data is set to $g=(x_i, y_i, z_i)$. The angle $\Phi$ of the x-measurement axis and the angle (of the y-measurement axis to the horizontal plane respectively are calculated by the following formulas.

$$\varphi = \tan^{-1}\frac{g_x - o_x}{g_z - o_z} \quad \text{[Formula 6]}$$

$$\eta = \tan^{-1}\frac{g_y - o_y}{g_z - o_z}$$

(Reference Point Estimation Method)

As described above, when geomagnetic data is obtained by using the three-axis magnetic sensor under the circumstance that the magnitude of geomagnetism is not varied, the geomagnetic measurement data is distributed on a spherical surface. When the two-axis magnetic sensor is moved on the horizontal plane, the geomagnetic data is distributed on a circle (so-called, an azimuth circle) in which an offset is centered at the circle. For simplification, a two-dimensional case will be primarily described below. A three-dimensional case will be described in the same theory as the two-dimensional case.

Figure 6:
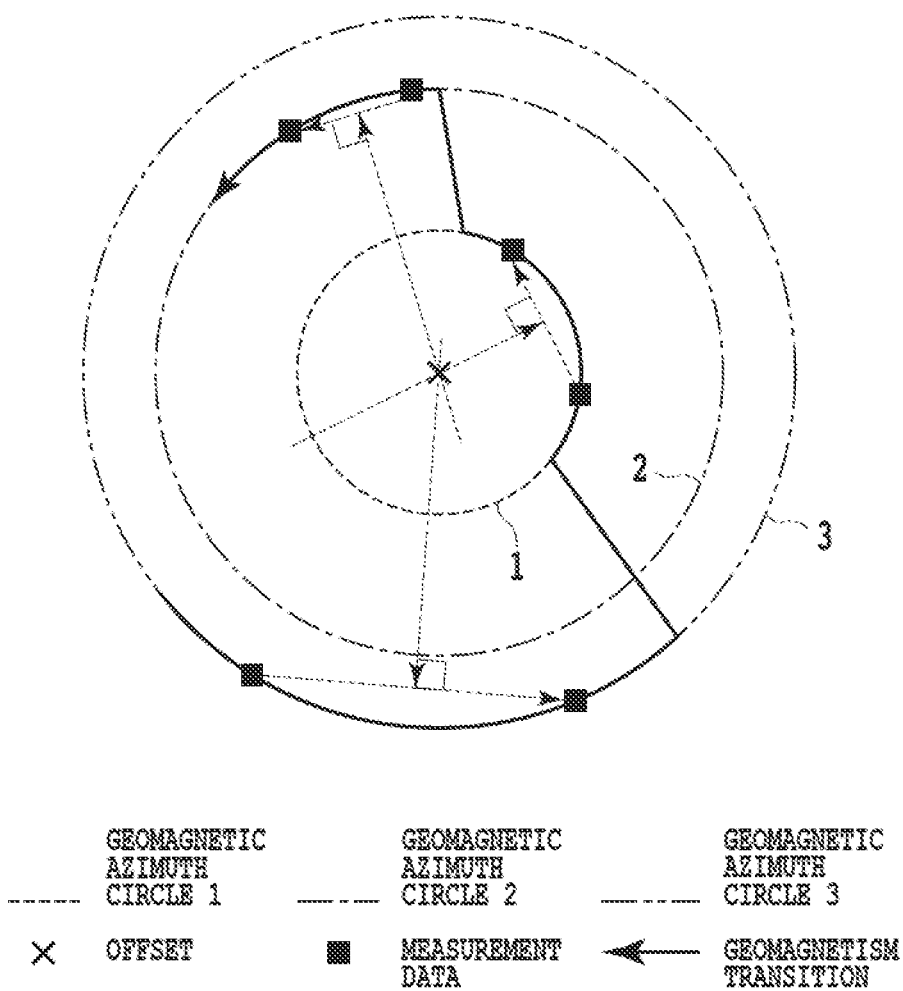
FIG. 6 is a diagram showing the concept of a method of estimating an offset by using data obtained under a circumstance where the geomagnetism size is non-uniform.

FIG. 6 is a diagram illustrating a method of estimating an offset by using data obtained from the circumstance that the size of geomagnetism is not uniform.

For example, FIG. 4 shows a variation of time to the magnetism detected by a two-axis magnetic sensor fixed horizontally on the dashboard of an automobile. Generally, an automobile rapidly moves under various magnetic circumstances. For example, a bridge is often an iron-based structure, and a large amount of the geomagnetism is induced into such structure. Then, the magnitude and direction of geomagnetism are varied. An iron-based structure may be buried under a road. In the case of a road in a city, the geomagnetism is also affected by buildings around the road. Thus, measurement values of the geomagnetism detected by the magnetic sensor mounted within the automobile are not distributed on only one circle, but are distributed on a plurality of circles located concentrically. As described above, [Formula 2] is a formula by which the offset included in the geomagnetic data is estimated from the geomagnetic data acquired in a space where the magnitude of the magnetism is uniform. Therefore, the accuracy of an offset calculated by [Formula 2] (a formula acquired by correcting [Formula 2] in terms of two components) is not of high precision.

FIG. 6 is a diagram for the concept of the present invention, and shows magnetic data obtained when the automobile moves under three regions that the magnitude of the geomagnetism is different.

A vector (difference vector) connecting two geomagnetic data acquired in a region in which the magnitude of the geomagnetism is the same is perpendicular to a vector connecting an offset and the middle point of the difference vector. In other words, the inner product of the difference vector connecting two geomagnetic data and the vector connecting an offset and the middle point of the difference vector should be about zero.

That is, two-axis measurement date that are repeatedly obtained by the geomagnetic sensor is set to $m_i=(x_i, y_i)$. An offset included in the measurement data of the geomagnetic sensor is set to $o=(o_x, o_y)$. The inner product of the difference vector comprised of two geomagnetic data mm and mn on one azimuth circle and a vector connecting the offset of the geomagnetic sensor with the middle point of the difference vector is zero.

Simply, when there are two groups of two geomagnetic data acquired in a region where the magnitude of the geomagnetism is the same (the magnitude of the geomagnetism when data on one group is acquired may be different from that when data on the other group is acquired), two difference vectors are calculated from the two groups of geomagnetic data, and thus it is possible to estimate, as the offset, a point at which the sum of the inner products of a vector connecting an offset point and the middle point of the difference vector and the difference vector is closest to zero. Since actual magnetic measurement data may include noise, and two geomagnetic data are not necessarily acquired in a region where the magnitude of the geomagnetism is the same, it is preferable to statistically determine the offset from a plurality of pair data.

On the other hand, it is useful to actively utilize at least one of the magnitude of the difference vector and the magnitude of a vector extending from an offset point to the middle point of the difference vector. As described later, as the magnitude of the difference vector is increased, an offset estimation error resulting from noise is decreased. Hence, in the offset estimation, the contribution of a large difference vector should be increased, and the contribution of a small difference vector should be decreased. The inner product of the vector connecting the middle point of the difference vector and the offset affects not only the angle of the two vectors but also the magnitude of the two vectors. In other words, since, when the difference vector is large, the effect of noise is decreased, the contribution of this difference vector to the offset estimation is increased whereas when the difference vector is small, the contribution is decreased.

The magnitude of the difference vector is preferably standardized by the magnitude of the vector connecting the offset to the middle point of the difference vector. In this case, it is possible to evaluate the magnitude of the difference vector as a movement angle (solid angle) on an azimuth circle, without depending on the size of geomagnetism.

The magnitude of the geomagnetism varies when a location is a little changed. Thus, it is difficult to obtain two measurement data on the exactly same azimuth circle, but it may be considered that two of data obtained in close locations (that is, close in time) exist on the same azimuth circle substantially. Even when the magnitude of the azimuth circle varies with time, if a pair of measurement data on the azimuth circle of the same (substantially the same) magnitude can be obtained, the inner products determined from each pair of measurement data are all close to zero. The square of the absolute value of the inner product determined from all pairs of the measurement data is represented by the following formula.

$$S = \sum_i \left\| (m_{2i+1} - m_{2i}) \cdot \left( \frac{m_{2i} + m_{2i+1}}{2} - o \right) \right\|^2 \quad \text{[Formula 7]}$$

Ideally, the value of "S" is zero. Actually, since the measurement value may include noise and may be a pair of measurement data that does not exist on the exactly same azimuth circle, the value of "S" is approximately zero. A method of estimating "o" so as to minimize [Formula 7] is appropriate as the estimation method. As the method of minimizing [Formula 7], there is a method of using iteration such as a Newton-Raphson method to determine "o" asymptotically. Further, it is possible to analytically determine "o" value by solving the following simultaneous equation.

$$\begin{bmatrix} \sum_i (x_{2i+1} - x_{2i})^2 & \sum_i (x_{2i+1} - x_{2i})(y_{2i+1} - y_{2i}) \\ \sum_i (x_{2i+1} - x_{2i})(y_{2i+1} - y_{2i}) & \sum_i (y_{2i+1} - y_{2i})^2 \end{bmatrix} \quad \text{[Formula 8]}$$

$$\begin{bmatrix} o_x \\ o_y \end{bmatrix} = \frac{1}{2} \begin{bmatrix} \sum_i (x_{2i+1}^2 - x_{2i}^2 + y_{2i+1}^2 - y_{2i}^2)(x_{2i+1} - x_{2i}) \\ \sum_i (x_{2i+1}^2 - x_{2i}^2 + y_{2i+1}^2 - y_{2i}^2)(y_{2i+1} - y_{2i}) \end{bmatrix}$$

In order for the inner product to be utilized, the magnitude of the difference vector and the magnitude of the vector from the offset to the difference vector may be standardized, and each of them may be used as a unit vector. That is, the inner product of a unit vector (standardized difference vector) extending from the middle point of the difference vector in the same direction as the difference vector and a unit vector extending from the offset point to the middle point of the difference vector is calculated, and thus it is possible to statistically determine an offset from a plurality of standardized difference vectors calculated from a plurality of geomagnetic data pairs.

On the other hand, as an example of a method that is similar but different, it is possible to utilize a perpendicular bisector of the difference vector. Since the perpendicular bisector of a difference vector formed from two points on one azimuth circle passes through the middle point of the azimuth circle, an evaluation formula of [Formula 9] or [Formula 10] is defined. It is preferable to determine "o" such that the evaluation formula gives the minimum value.

$$S = \sum_i \left\| m_{2i} + \left( (o - m_{2i}) \cdot \frac{(m_{2i+1} - m_{2i})}{\|m_{2i+1} - m_{2i}\|} \right) \frac{(m_{2i+1} - m_{2i})}{\|m_{2i+1} - m_{2i}\|} - \frac{m_{2i} + m_{2i+1}}{2} \right\|^2 \quad \text{[Formula 9]}$$

$$\sum_i \left| \frac{(m_{2i+1} - m_{2i}) \cdot \left( o - \frac{m_{2i} + m_{2i+1}}{2} \right)}{\|m_{2i+1} - m_{2i}\|} \right|^2 \quad \text{[Formula 10]}$$

As shown in Formula 9, the square of the distance between the middle point of a difference vector comprised of two measurement data and a point as a foot of a perpendicular drawn from the reference point to the difference vector is calculated for each difference vector. Thus, Formula 9 represents that the sum of value of the square of the distance calculated per each difference vector.

As shown in Formula 10, the square of the distance between the perpendicular bisector of a difference vector comprised of two measurement data and the reference point is calculated per each difference vector. Thus, Formula 10 represents that the sum of values of the square of the distance calculated per each difference vector. In the case of a three-component physical quantity detection device, the square of the distance between the perpendicular bisector plane of a difference vector comprised of two measurement data and the reference point is calculated per each difference vector, and thus the sum of values of the square of the distance calculated for each difference vector. The description of [Formula 10] of the three-component physical quantity detection device is the same as that of the two-component physical quantity detection device because [Formula 10] is represented by using a vector description.

[Formula 9] and [Formula 10] are the same formula except that the induced process of determining the formula is different.

As the method of minimizing [Formula 9] and [Formula 10], there is a method of using an iteration such as a Newton-Raphson method to determine "o" asymptotically.

Although [Formula 7], [Formula 9] and [Formula 10] are formed such that the sum of the squares of the absolute values, they may be generally formed such that the sum of the N-th powers of the absolute values is determined. For example, instead of the evaluation formula [Formula 7], the following formula may be used.

$$S = \sum_i \left\| (m_{2i+1} - m_{2i}) \cdot \left( \frac{m_{2i} + m_{2i+1}}{2} - o \right) \right\|^N \quad \text{[Formula 11]}$$

When the N becomes larger, the amount of calculation is generally increased and the range of values processed in the calculation step is extended. Thus, it is not applicable to a system in which the number of bits representing values is limited.

The perpendicular bisector of two difference vectors passes through the reference point when the physical quantity detection means detects a two-component physical quantity (In the case of a three-component physical quantity, the perpendicular bisector plane of three difference vectors is used). Thus, some pairs of two difference vectors are made, and the intersection of the perpendicular bisector is calculated per each pair. Then, the N-th power of the sum of the distance between the intersection calculated per the each pair and the reference point may be determined as an evaluation formula ([Formula 12]).

$$S = \sum_i \|C - o\|^N, \quad \text{[Formula 12]}$$

$$C = \begin{bmatrix} (m_{2i+1} - m_{2i})^T \\ (m_{2j+1} - m_{2j})^T \end{bmatrix}^{-1} \begin{bmatrix} \left( \frac{m_{2i} + m_{2i+1}}{2} \right) \cdot (m_{2i+1} - m_{2i}) \\ \left( \frac{m_{2j} + m_{2j+1}}{2} \right) \cdot (m_{2j+1} - m_{2j}) \end{bmatrix}$$

Here, as to a vector "a", $a^T$ represents a horizontal vector.

Further, a method for determining a specific point from a plurality of difference vectors (For example, "A" difference vectors) is defined. Some sets of "A" difference vectors are made, the specific point is calculated per each sets. Thus, a formula for determining the N-th power of the sum of the distances between the specific points calculated per the each sets and the reference point may be determined as an evaluation formula.

The value of N is preferably two or four.

For example, $(o_x, o_y)$ obtained by solving [Formula 7] from three difference vectors can be defined as the specific point.

Two or three difference vectors connecting any three points are defined, and planes where those difference vectors are present are defined. The point in which the sum of the inner product of those two or three difference vectors and a vector having the middle point of the difference vector as a base point is closest to zero is defined as the center of the plane. A plane normal line vector passing through the center of the plane passes through the offset.

A method of defining two or more of planes described above and estimating the intersection of the plane normal line vector of each of those planes is possible. Alternatively, for example, there is a method of defining, as the offset, the point in which the sum of the inner products of a vector on each of the planes and a vector passing through the center of the plane from the offset is zero.

(Data Selection Method)

As shown in FIG. 3 described above, in step S10, the data selection portion 42 determines whether or not each difference vector of the calculated difference vectors is suitable for the estimation of the reference point, selects and stores, based on the result of the determination, only a predetermined difference vectors (and data constituting the difference vectors) so as to estimate the reference point and outputs it to the reference point estimation portion 44.

The function of the data selection portion 42 will be specifically described below.

Because of, for example, a reason why, even if a difference vector is calculated from any two data acquired from the datum acquisition means 30 of FIG. 1, and o is determined such that the evaluation formula [Formula 7], [Formula 9] or [Formula 10] is the smallest, the measurement data generally contains noise or the two data constituting the difference vector is not necessarily present on an azimuth circle, the accuracy of estimating the offset is unsatisfactory depending on the method of selecting the two data constituting the difference vector. Hence, it is preferable to select only a difference vector suitable for the estimation of the reference point and estimate the reference point.

With one or a plurality of methods, the data selection portion 42 of FIG. 2 determines whether or not each difference vector of the difference vectors output from the reference vector calculating portion 41 is suitable for the estimation of the reference point, stores a difference vectors V2 that is formed with only the difference vector determined to be suitable for the estimation of the reference point and data D2 (a collection of vector physical quantity data used for calculation of each difference vector) that constitutes difference vectors and outputs them to the reference point estimation portion 44.

(Data Selection Example 1)

FIGS. 7A and 7B are diagrams illustrating a relationship between a difference vector utilized for estimation of the reference point, noise contained in measurement data 401 and an offset 400.

FIG. 7A shows an example in which the magnitude of the difference vector is large; FIG. 7B shows an example in which the magnitude of the difference vector is small.

FIGS. 7A and 7B show a relationship between a perpendicular bisector of the difference vector and the center of an azimuth circle when one of groups of data selected contains noise.

It is understood that, as the magnitude of the difference vector becomes smaller, the perpendicular bisector of the difference vector get away from the center of the azimuth circle even under the same noise. Thus, it is understood that, in order to reduce an estimation error resulting from the effect of the noise, it is desirable to use as large as possible a difference vector for the estimation of the reference point.

The difference vector whose magnitude is equal to or more than a predetermined value is used for the estimation of the reference point, and this predetermined value is managed as a measurement parameter by the offset estimation parameter management portion 46.

(Data Selection Example 2)

FIGS. 8A and 8B are diagrams that show a relationship between the difference vector utilized for estimation of the reference point, a time difference in the obtainment of measurement data 401 comprising the difference vector and the offset 400.

FIG. 8A shows an example of a case where the time difference is small; FIG. 8B shows an example of a case where the time difference is large.

FIGS. 8A and 8B show that the perpendicular bisector of a difference vector calculated from the measurement data 401 that is not located on the same azimuth circle may be located far away from a point showing the offset 400 even if the magnitude of the difference vector is large. Reference numeral 402 represents geomagnetic transition.

As described above, it is not desirable to use two magnetic data acquired in locations away from each other (away in time) so as to obtain a large difference vector because the magnitude of the geomagnetism varies depending on the location. Thus, it is necessary to determine that time when the two magnetic data for the calculation of the difference vector is not more than the predetermined value. This predetermined value is managed as the measurement parameter by the offset estimation parameter management portion 46.

(Data Selection Example 3)

Figure 9A:
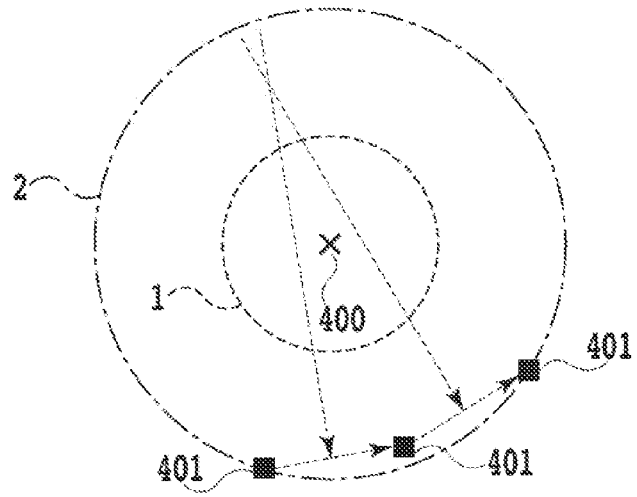
FIG. 9A is a diagram that illustrates, when noise is included in the measurement data, a relationship between an angle formed among the difference vectors utilized for estimation of the reference point and the offset, showing an example that the angle formed among the reference vectors is small.
Figure 9B:
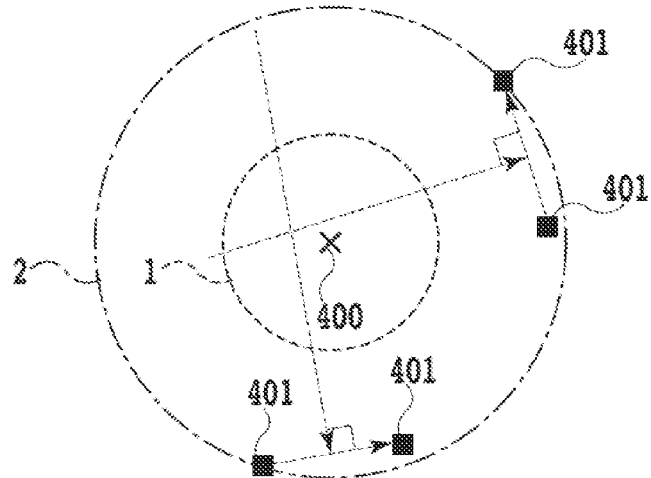
FIG. 9B is a diagram that illustrates, when noise is included in the measurement data, a relationship between an angle formed among the difference vectors utilized for estimation of the reference point and the offset, showing an example that the angle formed among the reference vectors is large.

FIGS. 9A and 9B are diagrams showing a relationship an angle formed among the difference vectors utilized for estimation of the reference point and the offset 400 when noise is included in the measurement data 401.

FIG. 9A shows an example of a case where the angle formed between the difference vectors is small. FIG. 9B shows an example of a case where the angle formed between the difference vectors is large.

FIGS. 9A and 9B show, when noise is included in the measurement data 401, a relationship between an angle formed among the difference vectors utilized for estimation of the reference point and the offset 400. An estimated reference point (an intersection between two difference vectors) may be located faraway from a true offset when an angle formed between two difference vectors (substantially parallel to each other) is small.

On the other hand, when an angle formed between two difference vectors is close to 90 degrees (a right angle), it is generally hard to be affected by the noise. In the case that an offset is statistically estimated from a large number of difference vectors, it is hard to be affected by the noise when the difference vectors are equally distributed in various directions.

From the problems of memory and computing power, it may be difficult in that storing all measurement data in memory of a portable device and calculating difference vectors distributed in various directions by using the stored measurement data. In a small-sized system such as a portable device, a method for obtaining difference vectors of various directions as the following.

Specifically, on the basis of a difference vector that is previously selected by the data selection portion, when an angle formed between the difference vector and a newly calculated difference vector is not less than a predetermined angle, the newly calculated difference vector is selected and stored. On the other hand, when the angle formed is not more than the predetermined angle, the newly calculated difference vector is determined to be unreliable and then is discarded. In this way, it is possible to avoid the estimation of the reference point by only using difference vectors indicating in the same direction. This predetermined value is managed as the measurement parameter by the offset estimation parameter management portion 46.

As described above, when the difference vectors used for the estimation calculation of the reference point points in various directions, a more reliable reference point is determined. When the distance between data constituting the selected two difference vectors is short, the difference vectors are more likely to point substantially in the same direction. Until a difference vector constituting data that is a predetermined distance or more away from data constituting a difference vector selected immediately before is calculated, a new difference vector is not selected and stored. This predetermined value is managed as the minimum amount of change in data by the offset estimation parameter management portion 46.

When the number of difference vectors or calculating the reference point is changed according to the situations, it is possible to control higher responsiveness and higher calculation accuracy. At the time of start-up of a power supply, the number of difference vectors used for the estimation of the reference point is decreased, the calculation accuracy is decreased but the responsiveness is kept high, the number of difference vectors used for the estimation of a gradual reference point is increased as the offset is determined and thus the calculation accuracy is increased. The number of difference vectors stored in the data selection means, that is, the number of difference vector used for the estimation of the reference point is managed as the measurement parameter by the offset estimation parameter management portion 46.

The other measurement parameters include a time interval during which the vector physical quantity detection means detects the vector physical quantity and a time interval during which the datum acquisition means acquires the vector physical quantity (referred to as a data acquisition time interval). When the data acquisition time interval is changed according to the situations, it is possible to control higher responsiveness and consumption power. At the time of start-up of the power supply, the data acquisition time interval is decreased, the first-determined estimation time of the offset is decreased, a more accurate offset is determined, the time interval is gradually increased and thus the consumption power can be reduced. The data acquisition time interval is managed as the measurement parameter by the offset estimation parameter management portion 46.

When a geomagnetic measuring device for measuring the geomagnetism with the vector physical quantity, and a pedestrian carries a portable mobile terminal incorporating the geomagnetic measuring device, difference vectors produced from measurement data continuous over time often point substantially in the same direction. In other words, the positive value of the inner product of two difference vectors continuous over time is often acquired continuously. On the other hand, when the positive and negative values of the inner product of two difference vectors continuous over time are randomly acquired, the measurement data is highly likely to contain noise. When the inner products of difference vectors obtained continuously in time are calculated one after another, and the value of the inner product is not less than a predetermined value a predetermined number of times or more, such difference vectors are determined to be suitable for the estimation of the difference vector and are selected and stored. This predetermined number of times and the predetermined value are managed as the measurement parameters by the offset estimation parameter management portion 46.

Although the inner products of two difference vectors continuous over time are considered to be likewise changed continuously, when the inner products are not continuously changed but are greatly changed instantaneously or only in a predetermined period of time, a change in step such as strong disturbance is estimated, and thus it is possible to cope with it by discarding the obtained data.

(Method of Determining the Reliability of the Reference Point)

As shown in FIG. 3 described previously, in step S20, the reliability determination portion 45 determines the reliability of the estimated reference point using difference vectors, data constituting the difference vectors and a reference point group that has been already estimated, and outputs, as an offset, only a predetermined reference point based on the determination result.

The function of the reliability calculating portion 45 will be specifically described below.

Although, in an example below, a method of determining the reliability of the reference point by comparison with one determination value is described by way of example, it is possible to have a plurality of determination values and divide the reliability into a plurality of sections. Here, in which section of the reliability the reference point is employed is a matter of design choice.

As described above, the measurement data includes noise and the magnitude of a vector physical quantity (for example, the magnitude of the geomagnetism) varies. Thus, the estimated reference point generally includes an error. It is necessary to check the degree of reliability of the estimated reference point. The estimated reference point is outputted as an offset only if it is determined to be reliable.

Figure 10A:
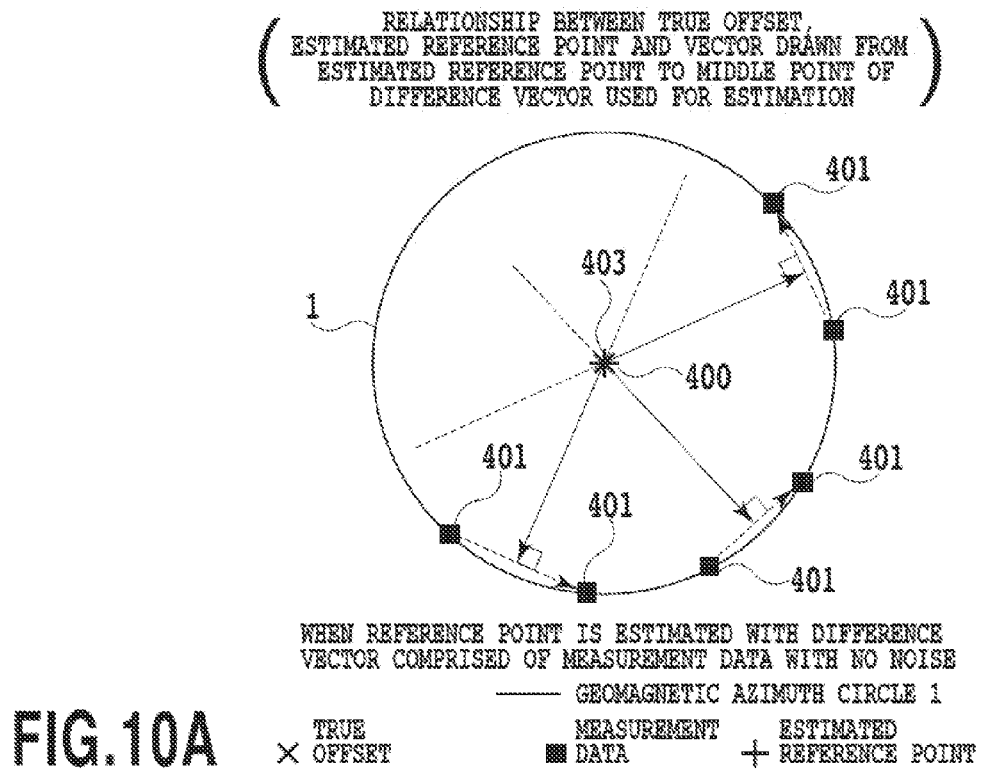
FIG. 10A is a diagram that illustrates a relationship between a true offset, an estimated reference point and a vector drawn from the estimated reference point to the middle point of the difference vector used for estimation, showing an example that the reference point is estimated on the difference vector comprised of the measurement data with no noise.
Figure 10B:
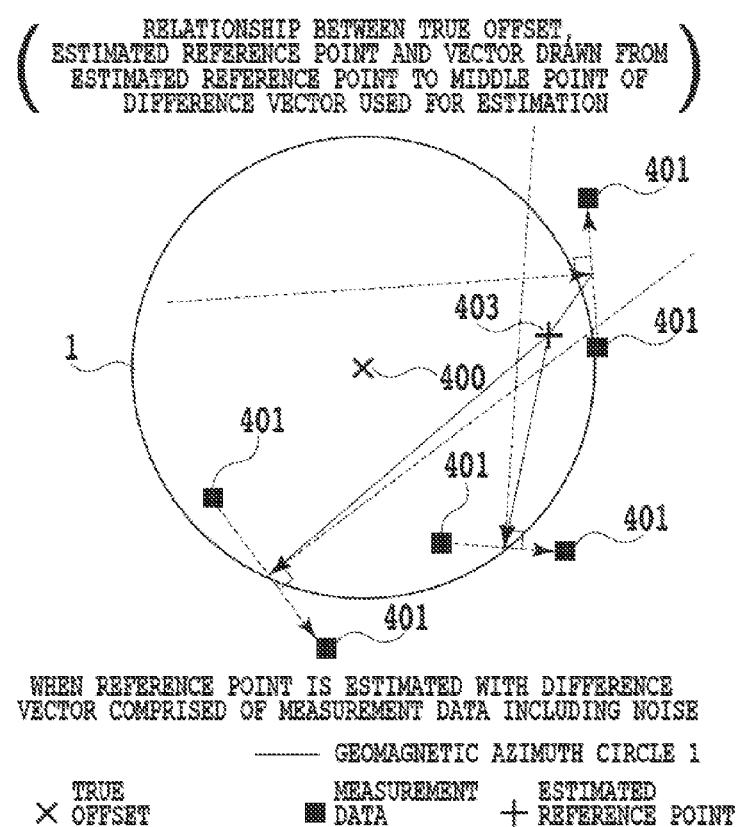
FIG. 10B is a diagram that illustrates the relationship between the true offset, the estimated reference point and the vector drawn from the estimated reference point to the middle point of the difference vector used for estimation, showing an example that the reference point is estimated on the difference vector comprised of the measurement data with noise.

FIGS. 10A and 10B are diagrams showing a relationship between the true offset 400, the estimated reference point 403 and a vector drawn from the estimated reference point 403 to the middle point of the difference vector used for the estimation.

FIG. 10A shows an example of a case where the reference point is estimated by using difference vectors comprised of the measurement data 401 with no noise. FIG. 10B shows an example of a case where the reference point is estimated by using difference vectors comprised of the measurement data 401 including noise.

In FIG. 10A, when each difference vector used for the estimation is obtained under a circumstance that the magnitude of vector physical quantity is the same value and each difference vector is comprised of the measurement data 401 with no noise, the estimated reference point is consistent with the true offset 400, and the vector connecting the middle point of each difference vector with the reference point is perpendicular to each difference vector.

On the other hand, when each difference vector used for the estimation is obtained under a circumstance that the magnitude of vector physical quantity is different value or each difference vector is comprised of data including noise, the estimated reference point 403 is not consistent with the true offset, and an angle formed between each difference vector and the vector connecting the middle point of each difference vector with the reference point is 90 degrees or less.

For all the difference vectors used for the estimation, an angle formed between the difference vector and the vector connecting the estimated reference point with the middle point of the difference vector is calculated. If the differences between all the calculated formed angles and the angle of 90 degrees are not more than a predetermined value, the estimated reference point is determined to be reliable. On the other hand, at least one of the differences between the formed angles and the angle of 90 degrees is not less than the predetermined value, the estimated reference point is determined to be unreliable and is then discarded. In this way, it is possible to estimate an offset with further improved reliability. This predetermined value is managed as a determination value by the offset estimation parameter management portion 46.

(Method 2 of Determining the Reliability of the Reference Point)

Figure 11:
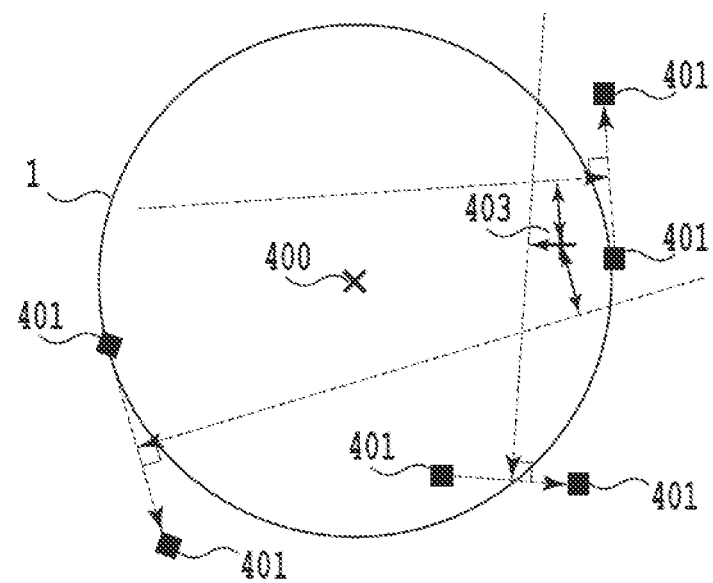
FIG. 11 is a diagram illustrating a relationship between the true offset, the estimated reference point and the difference vector used for the estimation.

FIG. 11 shows an example of a two-component vector physical quantity detection means, that is, an example of a case where the reference point is estimated by using a difference vector formed with the measurement data 401 including noise. The example where noise is not included is the same as in FIG. 10A.

In FIG. 10A, when each difference vector used for the estimation is obtained under a circumstance that the magnitude of vector physical quantity is the same value and each difference vector is comprised of the measurement data 401 with no noise, the estimated reference point is consistent with the true offset 400, and the perpendicular bisector of each difference vector passes through the reference point.

On the other hand, when each difference vector used for the estimation is obtained under a circumstance that the magnitude of vector physical quantity is different value or each difference vector is comprised of data including noise, the estimated reference point 403 is not consistent with the true offset 400, and the distance between the perpendicular bisector of each difference vector and the reference point is greater than zero.

With respect to all difference vectors used for the estimation, the distance between the perpendicular bisector of the difference vector and the estimated reference point is calculated. When the largest value of all calculated distances or the sum of all distances is not more than the predetermined value, the estimated reference value is determined to be reliable. On the other hand, when the largest value of the distances or the sum of the distances is not less than the predetermined value, the estimated reference value is determined to be unreliable, and is discarded. Thus, it is possible to estimate an offset whose reliability is further enhanced. This predetermined value is managed as a determination value by the offset estimation parameter management portion 46.

Since the distance between the perpendicular bisector of the difference vector and the reference point is equal to the distance between the foot of a perpendicular drawn from the reference point to the difference vector and the middle point of the difference vector, the reliability of the estimated reference point may be determine by using this distance.

(Method 3 of Determining the Reliability of the Reference Point)

In the case of a three-component vector physical quantity detection means, that is, when each difference vector used for the estimation is obtained under a circumstance that the magnitude of vector physical quantity is the same value and each difference vector is comprised of the measurement data 401 with no noise, the estimated reference point is consistent with the true offset 400, and the perpendicular bisector of each difference vector passes through the reference point.

On the other hand, when each difference vector used for the estimation is obtained under a circumstance that the magnitude of vector physical quantity is different value or each difference vector is comprised of data including noise, the estimated reference point is not consistent with the true offset, and the distance between the perpendicular bisector of each difference vector and the reference point is greater than zero.

With respect to all difference vectors used for the estimation, the distance between the perpendicular bisector of the difference vector and the estimated reference point is calculated. When the largest value of all calculated distances or the sum of all distances is not more than the predetermined value, the estimated reference value is determined to be reliable. On the other hand, when the largest value of the distances or the sum of the distances is not less than the predetermined value, the estimated reference value is determined to be unreliable, and is discarded. Thus, it is possible to estimate an offset whose reliability is further enhanced. This predetermined value is managed as a determination value by the offset estimation parameter management portion 46.

(Method 4 of Determining the Reliability of the Reference Point)

As described above, when the difference vectors used for the estimation calculation of the reference point points in various directions, a more reliable reference point is determined. As a condition necessary for the difference vectors used for the estimation calculation of the reference point to point in various directions, there is a condition on that components of each axis in the difference vectors vary greatly. When this variation is not less than a predetermined value, the estimated reference point is determined to be reliable. This predetermined value is managed as the determination value by the offset estimation parameter management portion 46.

(Method 5 of Determining the Reliability of the Reference Point)

As described above, as an index for determining the reliability of the offset, there is a variation of a plurality of estimated reference points. When a variation of a specific number of reference points determined immediately before is not more than a predetermined value, the estimated reference point is determined to be reliable. This predetermined value is managed as the determination value by the offset estimation parameter management portion 46. Moreover, the number of reference points used for determining this variation is managed as a calculation parameter by the offset estimation parameter management portion 46.

(Method 6 of Determining the Reliability of the Reference Point)

The distance between datum constituting a difference vectors used for the estimation of the reference point and the reference point corresponds to the magnitude of a vector physical quantity when the data is acquired. For example, when the physical quantity measuring device is a geomagnetic detection device that detects the geomagnetism, the distance between the data and the estimated reference point corresponds to the magnitude of the geomagnetism when the data is acquired. The magnitude of the geomagnetism in Japan is about 45 uT; when the magnitude of the geomagnetism that greatly deviates from this is calculated, the estimated reference point probably includes a large error, that is, data itself used for the estimation of the reference point probably includes a large error. Hence, when the distance between datum constituting the difference vectors used for the estimation of the reference point and the reference point is between predetermined upper and lower limit values, the estimated reference point is determined to be reliable. These upper and lower limit values are managed as the determination value by the offset estimation parameter management portion 46.

(Method 7 of Determining the Reliability of the Reference Point)

When a difference between a time when data is first acquired among the data constituting the difference vectors used for the estimation of the reference point and a time when data is last acquired is too large, it is highly likely that the offset of the physical quantity measuring system itself is changed. Hence, the reliability estimated from such data is low. Only when the time difference is not more than a predetermined value, the estimated reference point is determined to be reliable. This predetermined value is managed as the determination value by the offset estimation parameter management portion 46.

(Method 7 of Determining the Reliability of the Reference Point)

When the difference vectors used for the estimation of the reference point is distributed on the same plane, the reference point estimated from such a difference vectors includes a large error. Whether or not the difference vectors are distributed on the same plane serves as an important index for determining the reliability of the estimated reference point. Whether or not the difference vectors are distributed on the same plane is determined as follows. Specifically, when, in a three-component vector physical quantity measuring device, data constituting the difference vectors are assumed to be $(x_i, y_i, z_i)$, the data $(x_i, y_i, z_i)$ are applied to a plane represented by [Formula 13].

$$ax+by+cz+d=0 \quad \text{[Formula 13]}$$

Each coefficient (a, b, c, d) of [Formula 13] is given as follows. Specifically, $$XX = \sum^{N} x(x-\bar{x})$$
$$YY = \sum^{N} y(y-\bar{y})$$
$$ZZ = \sum^{N} z(z-\bar{z})$$
$$XY = \sum^{N} x(y-\bar{y}) = \sum^{N} y(x-\bar{x})$$
$$YZ = \sum^{N} y(z-\bar{z}) = \sum^{N} z(y-\bar{y})$$
$$ZX = \sum^{N} z(x-\bar{x}) = \sum^{N} x(z-\bar{z})$$

[Formula 14]

When above assumption is made, $$Det0 = YY \times ZZ - YZ \times YZ$$

$$Det1 = ZZ \times XX - ZX \times ZX$$

$$Det2 = XX \times YY - XY \times XY$$

The maximum value is determined by calculating the above formula. Depending on which formula is the maximum value, the following corresponding simultaneous linear equations are solved, and each coefficient is calculated.

When Det0 is the largest (here, $a = 1$) [Formula 16]

$$\begin{bmatrix} YY & YZ \\ YZ & ZZ \end{bmatrix} \begin{bmatrix} b \\ c \end{bmatrix} = -\begin{bmatrix} XY \\ ZX \end{bmatrix}$$

When Det0 is the largest (here, $b = 1$)

$$\begin{bmatrix} ZZ & ZX \\ ZX & XX \end{bmatrix} \begin{bmatrix} c \\ a \end{bmatrix} = -\begin{bmatrix} YZ \\ XY \end{bmatrix}$$

When Det0 is the largest (here, $c = 1$)

$$\begin{bmatrix} XX & XY \\ XY & YY \end{bmatrix} \begin{bmatrix} a \\ b \end{bmatrix} = -\begin{bmatrix} ZX \\ YZ \end{bmatrix}$$

Furthermore, $$d = -\frac{1}{N} \sum aSi_x + bSi_y + cSi_z$$

A distance di from datum $(x_i, y_i, z_i)$ to the plane to which data is applied is given by $$d_i = \frac{ax_i + by_i + cz_i + d}{\sqrt{a^2 + b^2 + c^2}} \qquad \text{[Formula 17]}$$

Whether or not the distance di of each point is positive or negative is different depending on which one of two regions divided by the estimated plane each point belongs to. When the maximum value and the minimum value of the distance di of each point are determined, and this difference is not less than a predetermined value, the estimated reference value is determined to be reliable.

In the method described above as an example, it is possible to determine the reliability of the reference point. In this case, the reliability of the reference point of two values by one determination value described as an example or the reliability of the reference point of a plurality of sections by a plurality of determination values or information compared with the determination value when the reliability is determined, that is, reliability information, is output to the outside, and thus it is possible for the system to recognize the reliability of the reference point employed as the offset. Needless to say, the method of determining the reliability of the reference point is not necessarily limited to above example.

(Management of the Determination Value of the Reliability Information, the Measurement Parameter and the Calculation Parameter)

For example, when the physical quantity measuring device is a geomagnetic measuring device that detects the geomagnetism, at the time of start-up of the power supply or if the magnetized state in the vicinity of a geomagnetic sensor greatly varies, the value of an offset may be changed from a value that was determined in the past. However, in this case, the measurement data obtained by the measurement that has been performed so far is not present or the data that has been obtained so far is invalid. At this time, since if the determination value of the reliability information is too tight, it may take much time to calculate the proper value, at first, the determination value is preferably set loose.

The difference data suitable for the estimation of a highly reliable offset is acquired, the highly reliable offset is recognized to be estimated and then the determination value is gradually set tight, and thus it is possible to gradually increase the accuracy of the estimated offset.

When the physical quantity measuring device varies little in a two-dimensional or three-dimensional space, measurement data output from the sensor also varies little. Even when the reference point is calculated from data or a difference vector obtained by collecting data that varies little, the effects of fluctuation of data and noise are increased, and thus the reference point may be inaccurate. In order to increase the accuracy of the offset, it is important to evaluate the amount of variation from previously selected data with respect to data output from the sensor and to employ only data that varies by a predetermined value or more to configure a difference vectors. However, if a threshold value for the amount of variation is set high, since data is selected only when the physical quantity device varies greatly, it takes much time to calculate the offset. In other words, the setting is made such that when the reliability of the offset may be low but the offset is rapidly determined, data which varies little is also selected whereas when the calculation of the offset may take much time but it is desired to increase the reliability, only data which varies greatly is selected.

In order for the reliability of the offset to be determined, the variation of a plurality of estimated reference points is evaluated. Although the number of reference points to be evaluated is preferably increased as much as possible so as to obtain a highly reliable offset, in order to rapidly calculate the offset when measurement data are not present or the data that have been obtained so far are invalid at the time of start-up of the power supply or if the magnetized state of the vicinity greatly varies, it is necessary to decrease the number of reference points to be evaluated.

When the offset varies according to the change of a circumstance where the physical quantity measuring device is used, it is impossible to calculate the amount of each type of calculation with the offset that has been used. In this case, the data that have been acquired are all discarded, and then it is necessary to recalculate the offset with data that are newly acquired.

The circumstance where the physical quantity measuring device is used includes a case where, when a geomagnetic sensor is used, a system incorporating the geomagnetic sensor receives a strong magnetic field produced by a train, a railroad crossing or the like and the amount of magnetization of a magnetic substance constituting the system is changed and a case where, when an acceleration sensor is used, the temperature of the circumstance is changed.

As one of means for finding the change of the amount of magnetization, there is a determination method using the magnitude of magnetic data calculated from an offset that is employed at that time. For example, there is a method of comparing the magnitude of the geomagnetism calculated from the magnitude of geomagnetism expected in the position on the earth where the physical quantity measuring device used is present and an offset and magnetic data that are employed at that time. The magnitude of the geomagnetism in Japan ranges from 45 to 50 microtesla ($\mu$T).

Other means for finding the change of the amount of magnetization include methods using a depression, the range of acquired data, the variation of the reference point, a difference from the reference point calculated immediately before, a known event that causes change of the magnetized state and the like. When there is a known event that causes change of the magnetized state, means for detecting the event is provided, and thus it is possible to detect the event.

For example, when a foldable mobile telephone incorporates an azimuth measuring device, the folding of the mobile telephone may change the magnetized state. Some recent mobile telephones can use an external memory card for storing image data and music data, and the removal and insertion of the memory card may change the magnetized state. An operation can be considered of, for example, detecting such an event, recognizing the possibility of the magnetized state of the system being changed, determining the possibility of the offset being changed, discarding all data that have been acquired so far and recalculating an offset from date that are newly acquired. A button may be provided with which a user notifies the azimuth measuring device of the change of the magnetized state at the discretion of the user.

When an acceleration sensor is used, the offset may be irreversibly varied by an impact resulting from the drop or the like. By recognizing the impact, that is, by recognizing that the range of the acquired data exceeds a predetermined value, it is possible to detect the impact. Since it is expected that the system is brought into a free fall state immediately before the drop, when the free fall state is measured, that is, nearly an acceleration of 0 G is measured, the system may be determined to drop. After an acceleration of nearly 0 G is measured, when it is detected that an acceleration exceeding a predetermined range is applied, the system may be determined to drop.

It is possible to find the change of the temperature with a temperature sensor provided separately from the physical quantity measuring device.

When the offset has been varied, if the determination value for determining a highly accurate offset before the variation of the offset is set loose, and thus the determination value is set to the determination value for more quickly determining the offset, it is possible to rapidly cope with the variation of the offset. It is not often effective that the determination value is returned to the initial value.

As described above, the offset estimation parameter is changed according to the change of circumstances inside and outside the physical quantity measuring device, and thus it is possible to perform control suitable for the state of the physical quantity measuring device and the circumstance of usage.

When the state of the physical quantity measuring device is suddenly changed and is returned to the original state (for example, a magnet is erroneously brought close to an azimuth measuring device incorporating a geomagnetic sensor), it is too early to discard the offset. It is not necessary to discard the offset as long as the magnitude of a vector physical quantity such as the geomagnetism is returned to a permissible value within a predetermined period of time.

There is a method of changing, after an offset has been estimated a predetermined number of times or more in a certain offset estimation parameter, the offset estimation parameter. After it is recognized that, in one offset estimation parameter, an offset is stably estimated, the offset estimation parameter is changed to an offset estimation parameter in which a highly accurate offset can be estimated. Even when the offset is determined in a certain offset estimation parameter, since a technology on which the estimation is based is a statistical method, it is impossible to deny that the offset is estimated from data that accidentally includes much noise. By setting this predetermined number of times to the calculation parameter, the offset estimation parameter management portion 46 may manage it as the determination value. As described above, the offset estimation parameter is related to the reliability of the offset, and an offset estimation parameter used when a certain offset is determined can be said to represent the reliability of the offset, that is, it can be considered that the reliability of the offset is expressed by which one of the offset estimation parameters the offset is determined in.

The offset estimation parameters may be previously prepared in a table as a set of a plurality of parameter groups, or the offset estimation parameters may be calculated by a formula from the magnitude of the vector physical quantity and the value of the variation of the reference point. When the table is prepared, with respect to the sequence of an update, the state may be updated one by one, or the update may be performed while several states are being skipped.

For example, when the determination value is set tighter, it is appropriate to narrow the determination value and the parameter step by step; when the reliability is determined to be low, for example, by the fact that the magnitude of the calculated vector physical quantity is abnormally high, it is appropriate to set the offset estimation parameter loose to the initial value at once and recalculate the offset. Depending on time and circumstances, it is preferable to set the offset estimation parameter tight by a plurality of steps.

When the physical quantity measuring device can output an offset estimation parameter that is being used each time, the user of the physical quantity measuring device can find the reliability of the amount of calculation performed by the calculating portion.

The difference of the technologies between the present invention and literature 8 will be described below.

In a place such as an urban area where there are a large number of artificial structures, a region where the geomagnetism is uniform is extremely small. Thus, two magnetic data are obtained by a pedestrian even if times are close to each other, in almost all cases, the magnitudes of the geomagnetism at locations where magnetic data are obtained do not completely match with each other. The magnetic data often includes noise due to the effects of a magnetized mobile unit such as an automobile and various currents that occur indoors and outdoors.

FIGS. 9A and 9B are diagrams showing a relationship between an intersection between two perpendicular bisectors set by the geomagnetic data including noise and a true offset. When the magnetic data includes noise, a large amount of errors are included depending on the perpendicular bisector used for the estimation of an offset.

Figure 12:
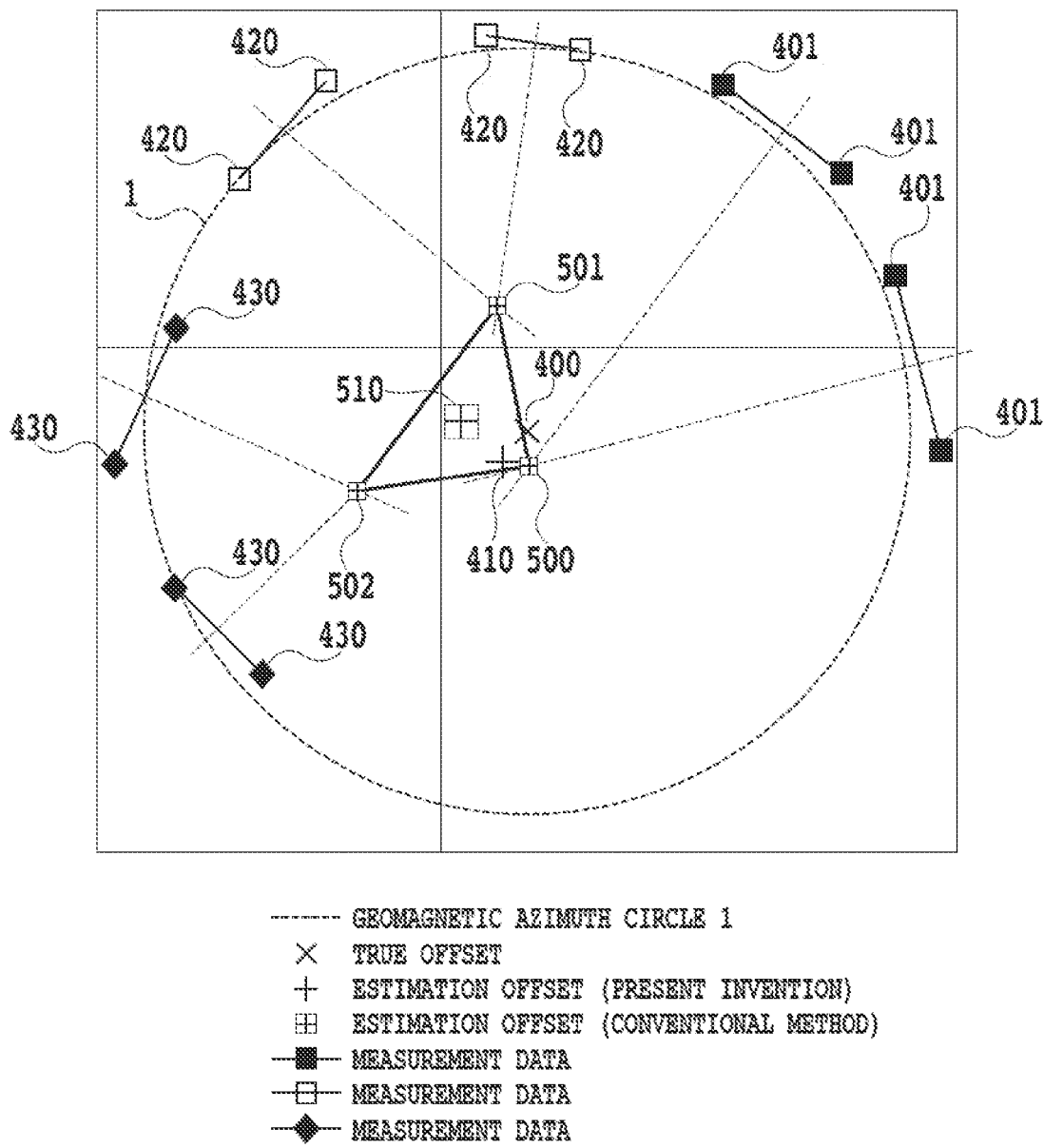
FIG. 12 is a diagram illustrating the concept that an offset is estimated by using [Formula 8] according to the present invention and the method disclosed in literature 8.

FIG. 12 is a diagram illustrating the concept of a case where an offset is estimated by use of [Formula 8] and the method disclosed in literature 8.

In FIG. 12, a true offset of the geomagnetic sensor is represented by "X", and an azimuth circle drawn according to measurement values of the geomagnetic sensor is represented by a dotted line. Here, the reference numeral 410 represents an offset estimated by [Formula 8] from 12 points of magnetic data. The reference numeral 510 represents an offset estimated from literature 8.

The offset 410 estimated by [Formula 8] is determined from all 12 points of magnetic data at a time.

In literature 8, the offset 510 is estimated as the following steps. First, an intersection 500 of two bisectors is determined from four points that are respectively represented by measurement data 401, measurement data 420 and measurement data 430. Next, three intersections that are finally determined are averaged. Noise not more than 10% of a radius of the azimuth circle is included in all magnetic data.

As shown in FIG. 12, the offset 410 determined from [Formula 8] of the present invention is not equal to the offset 510 determined by the method disclosed in literature 8.

According to the method of the present invention, noises superimposed on the difference vector are cancelled each other due to a random characteristic. Even if the noise is superimposed on the difference vector, an offset value close to a true value can be calculated.

On the other hand, in the method of literature 8, a perpendicular bisector connecting two points that are located a relatively short distance apart is used. Further, the intersection is determined by two perpendicular bisectors that are relatively close to each other and the determined intersection is averaged. In this case, noises included in the two perpendicular bisectors that are relatively close to each other are not always cancelled each other, and noises included in the offset value are increased. Thus, the offset value may be greatly different from the true value. Here, even if a plurality of intersections between the perpendicular bisectors is averaged, noises are not cancelled each other. The error between the true value and the determined offset is probably increased.

Figure 13:
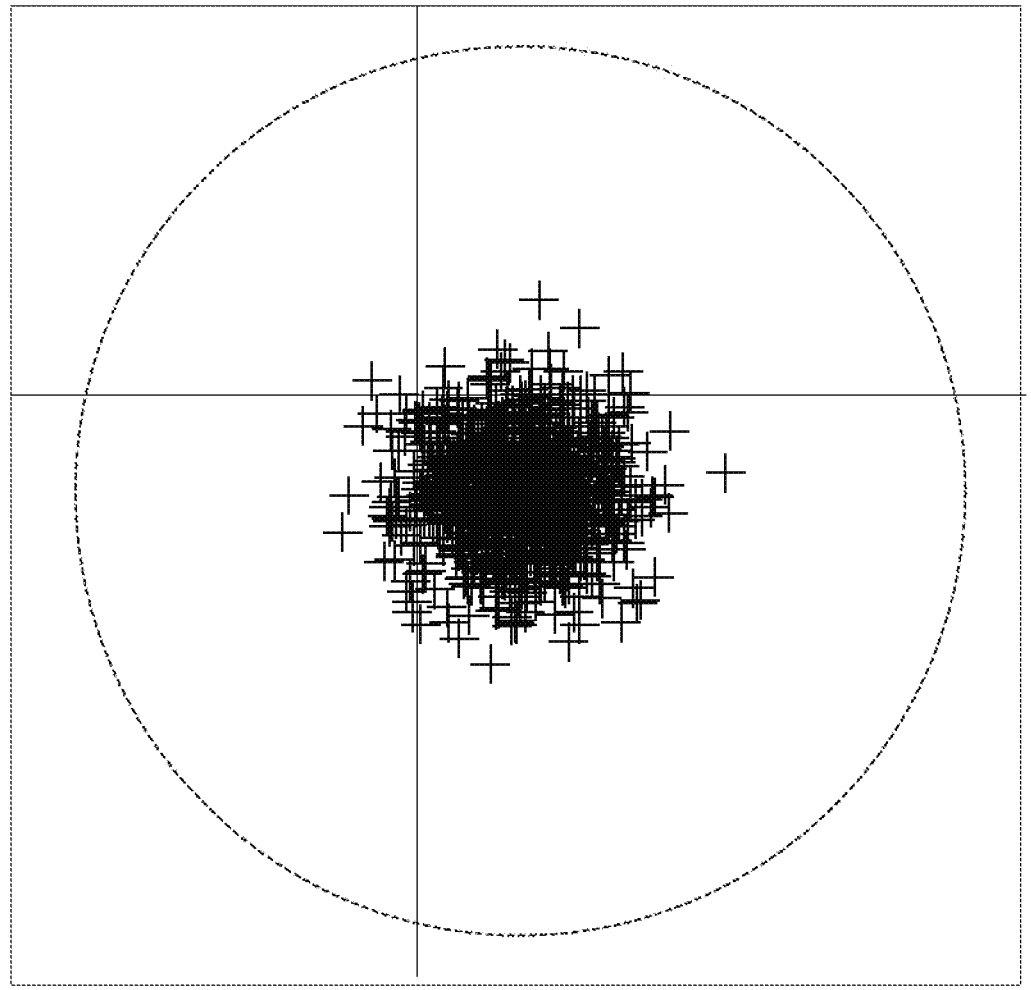
FIG. 13 is a diagram illustrating the estimation variation of offsets that are estimated with [Formula 5]

FIG. 13 is a diagram showing all the offsets that are estimated by performing an offset estimation with [Formula 8] of the present invention 1000 times.

Figure 14:
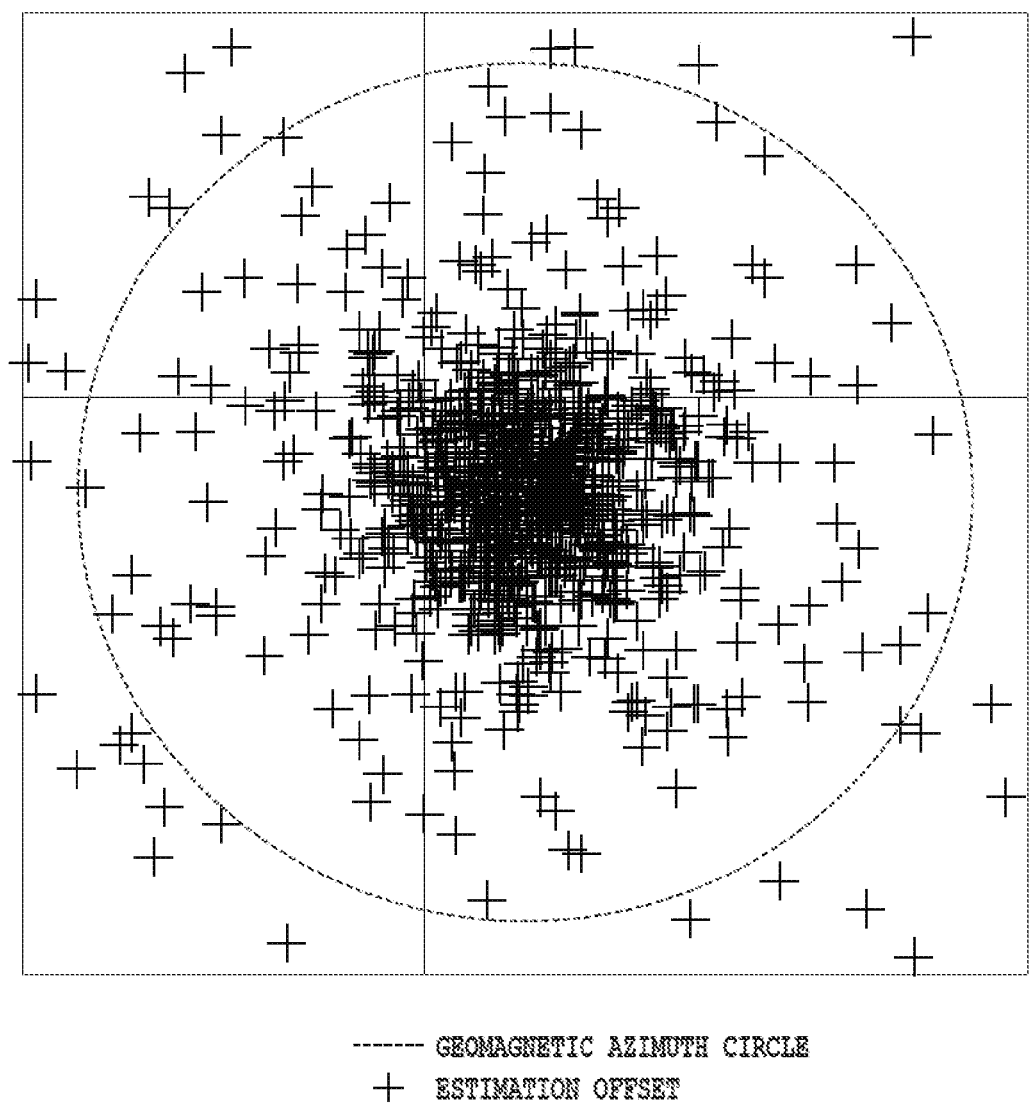
FIG. 14 is a diagram illustrating the estimation variation of offsets that are estimated with the method disclosed in literature 8.

FIG. 14 is a diagram showing all the offsets that are estimated by performing an offset estimation with the method of literature 8 1000 times.

In FIGS. 13 and 14, the offset is estimated from the same magnetic data each time. From the result of the comparison between two drawings, estimation precision of the offset according to the method of the present invention is higher than that of the conventional method.

As described above, according to the present invention, when, based on a predetermined evaluation formula using a difference vectors, an offset included in the acquired vector physical quantity data are statistically estimated, the reliability information on the reference point is calculated based on at least one of the vector physical quantity data, the difference vectors and a plurality of estimated reference points according to the calculation parameter for calculating the reliability information on the reference point, the reliability of the reference point is determined by comparing the reliability information with a determination threshold value, and the reference point determined to be highly reliable is output as an offset included in the vector physical quantity data acquired by the datum acquisition means. Therefore, even when the measurement date are not a measurement data that are acquired in a space in which the magnitude of the vector physical quantity to be measured is not uniform, it is possible to estimate a highly reliable offset rapidly and highly accurately according to the situations, and thus it is possible to further enhance the reliability of the estimated offset.

Second Example

The second embodiment of the present invention will be described based on FIGS. 15 and 16. The same parts as those of the above-described first example are identified with like reference numerals, and their description will be omitted.

Although, in FIG. 2, the data selection portion 42 uses an output from the difference vector calculating portion as an input, the following configuration may be used.

Figure 15:
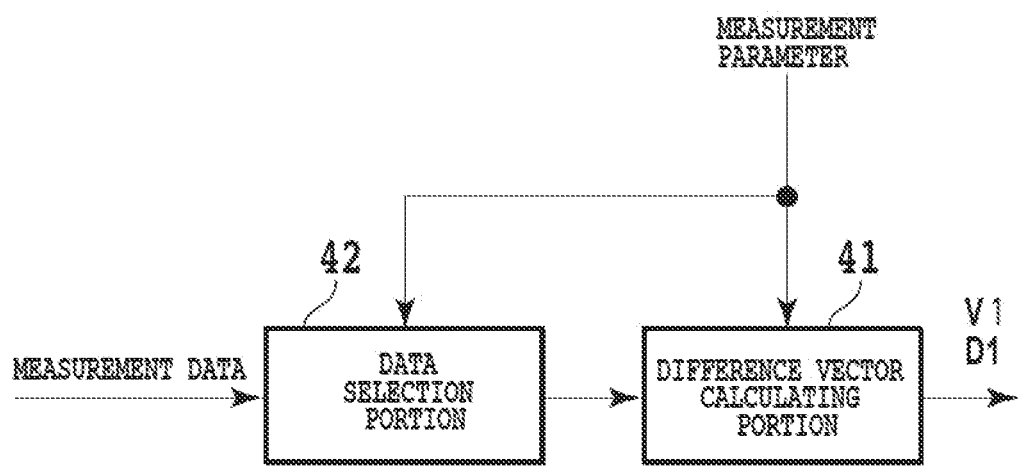
FIG. 15 is a diagram illustrating an another example of configuration of a data selection portion and a difference vector calculating portion in the physical quantity measuring device according to a second embodiment of the present invention.

As shown in FIG. 15, the measurement data is first selected by the data selection portion 42, and the reference vector calculating portion 41 may calculate the difference vector from the selected data.

Figure 16:
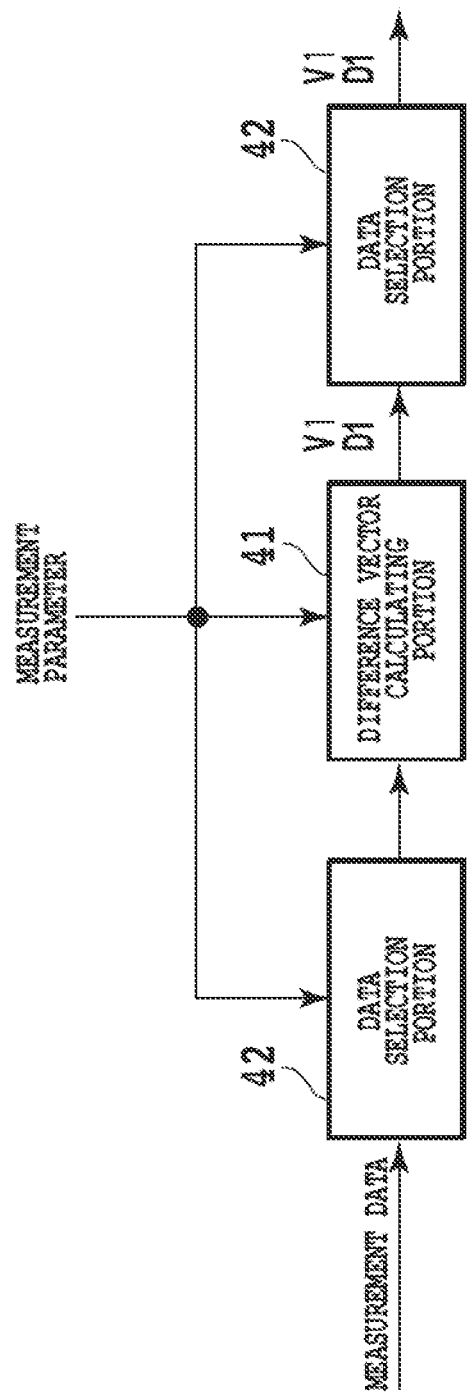
FIG. 16 is a diagram illustrating an another example of conFiguration of the data selection portion and the difference vector calculating portion in the physical quantity measuring device according to the second embodiment of the present invention.
Figure 17:
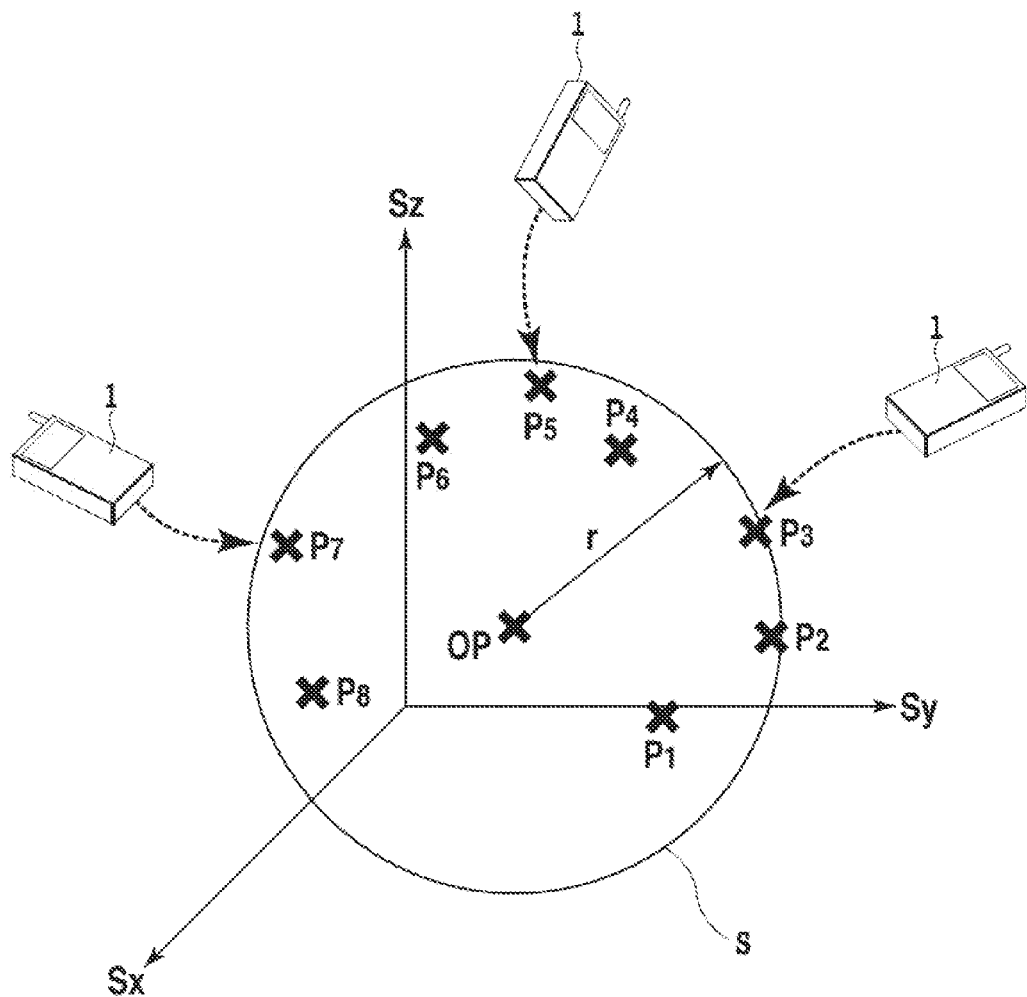
FIG. 17 is a diagram illustrating the concept of a method of estimating the offset in a conventional azimuth measuring device.
Figure 18:
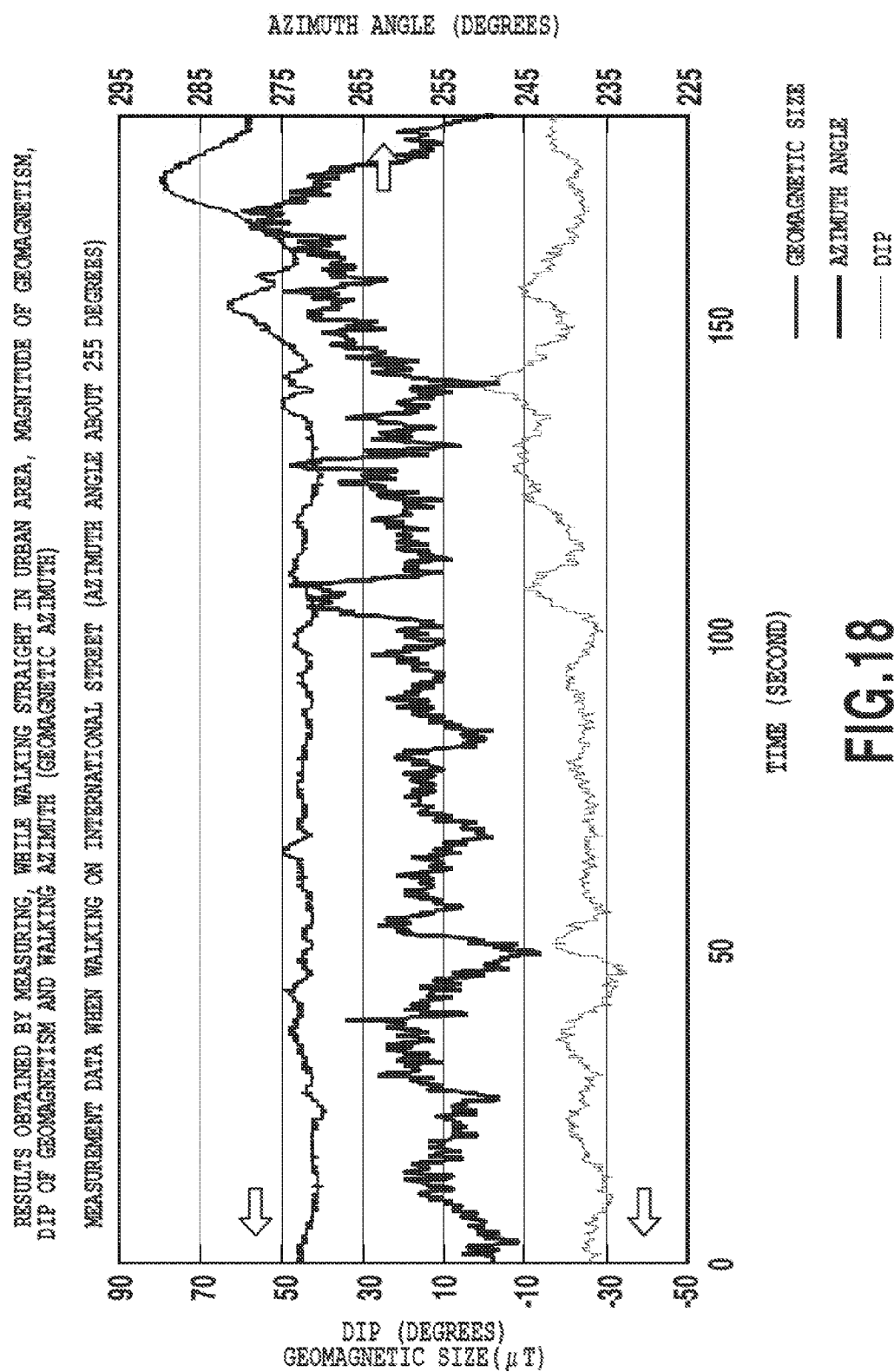
FIG. 18 is a diagram showing a result of measuring, while walking straight in an urban area, the magnitude of the geomagnetism, the dip of the geomagnetism and a walking azimuth (a geomagnetic azimuth)
Figure 19:
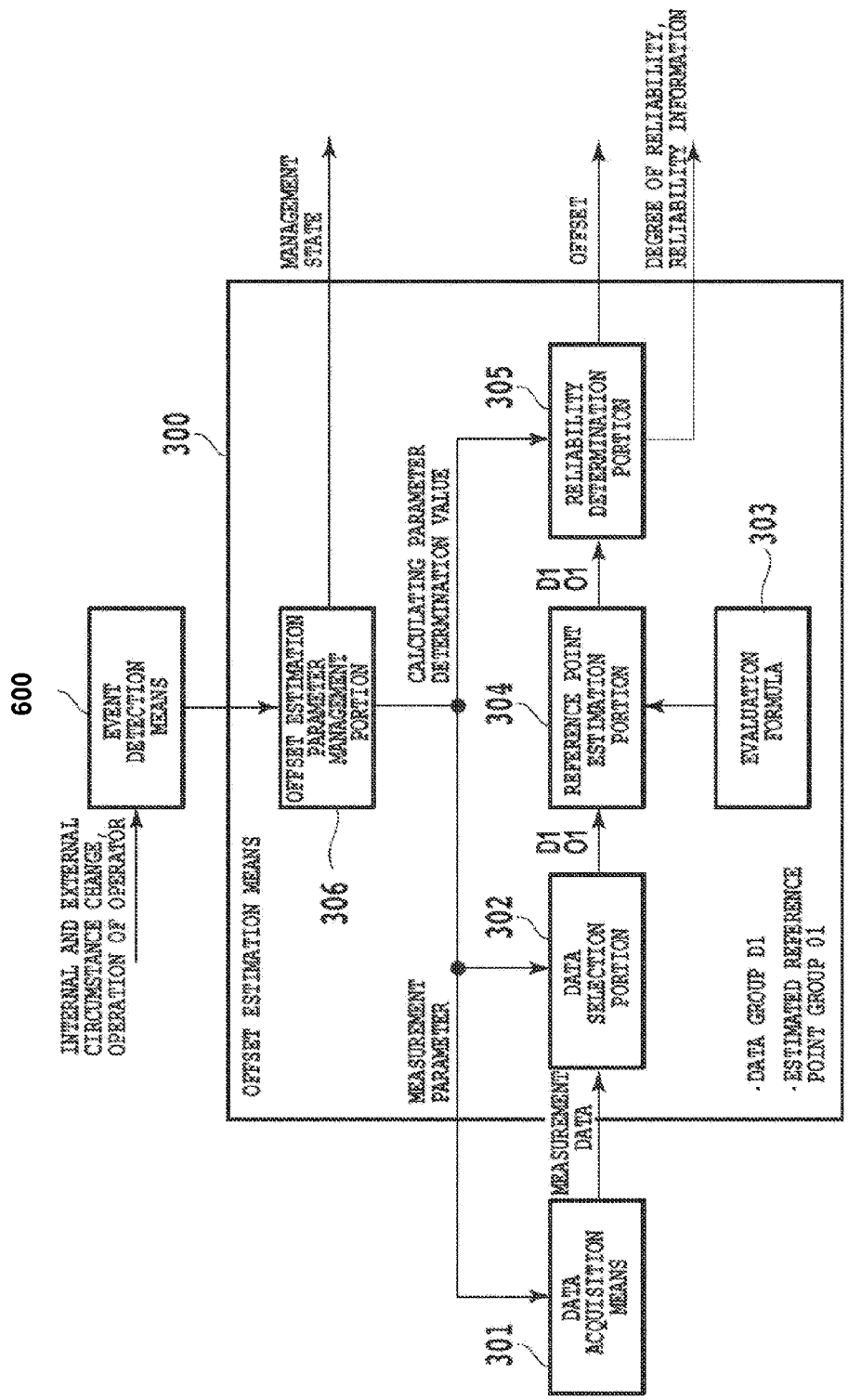
FIG. 19 is a block diagram showing the configuration of a conventional offset estimation means.

As shown in FIG. 16, the difference vector calculated in FIG. 15 is input to a separate data selection portion 42, and the selection may be further performed.

As described above, the geomagnetism, the acceleration or the like is taken as a familiar example of a vector physical quantity to be measured in the present invention. Any other physical quantity such as artificial stationary magnetic field or electric field may be used when variation of the magnitude of a vector physical quantity is slower relative to variation of the relative positional relationship between the vector physical quantity and a vector physical quantity detection means.

The invention claimed is:

1. A physical quantity measuring device for measuring a physical quantity, comprising:
    a vector physical quantity detection means for detecting a vector physical quantity composed of a plurality of components;
    a datum acquisition means for repeatedly obtaining the detected vector physical quantity as vector physical quantity datum to obtain vector physical quantity data; and
    an offset estimation means for calculating difference vectors from the obtained vector physical quantity data and statistically estimating an offset included in the obtained vector physical quantity data based on a predetermined evaluation formula using the calculated difference vectors,
    wherein the offset estimation means includes:
    a difference vector calculating portion for calculating the difference vectors using a difference between each component of the obtained vector physical quantity data;
    a data selection portion that selects and stores the difference vectors based on a predetermined measurement parameter;
    a reference point estimation portion that statistically estimates, based on the evaluation formula using the selected difference vectors, coordinates of a reference point on a coordinate system where each component of the obtained vector physical quantity data is a coordinate value; and
    a reliability determination portion that calculates reliability information on the reference point using the difference vectors according to a calculation parameter for calculating the reliability information on the reference point, that compares the reliability information with a determination threshold value to determine a degree of reliability on the reference point and that outputs the reference point determined to have a desired reliability as an offset included in the vector physical quantity data obtained by the datum acquisition means; and
    wherein the evaluation formula is determined using an N-th power of an absolute value of an inner product of the difference vector and a vector connecting a middle point of the difference vector and the reference point.

2. The physical quantity measuring device of claim 1,
    wherein the offset estimation means includes an offset estimation parameter management portion that manages, as an offset estimation parameter, the determination threshold value, the measurement parameter and the calculation parameter, and
    the offset estimation parameter management portion changes the offset estimation parameter based on at least one of the reliability information calculated by the reliability determination portion, and the determined degree of reliability, and a number of times that the desired reliability is determined, and a time during which the offset estimation parameter is used.

3. The physical quantity measuring device of claim 2, further comprising:
    an event detection means for detecting a change of a circumstance inside and outside the physical quantity measuring device or an operation of an operator,
    wherein, when an event occurs, the offset estimation parameter management portion determines there is a possibility that the degree of reliability of the output offset is degraded, and changes the offset estimation parameter.

4. The physical quantity measuring device of claim 3,
    wherein the change of circumstance is a change of temperature.

5. The physical quantity measuring device of claim 3 or 4,
    wherein, when the data obtained by the datum acquisition means exceed a predetermined range, the offset estimation parameter management portion determines that the circumstance has changed, and changes the offset estimation parameter.

6. The physical quantity measuring device of claim 1, wherein the N is two or four.

7. The physical quantity measuring device of claim 1,
    wherein the measurement parameter includes a time interval at which the vector physical quantity detection means detects the physical quantity or a time interval at which the datum acquisition means obtains the vector physical quantity.

8. The physical quantity measuring device of claim 1,
    wherein the measurement parameter includes an amount of change of data, the amount of change of data is a difference between the vector physical quantity data obtained by the datum acquisition means and the data selected by the data selection portion, and the data selection portion selects the data in which the amount of change of data is not less than a predetermined value.

9. The physical quantity measuring device of claim 1, wherein the measurement parameter includes a number value of vector physical quantity data to estimate the reference point by the offset estimation means.

10. The physical quantity measuring device of claim 1, wherein the measurement parameter includes a time difference when two vector physical quantity data constituting a difference vector are obtained, and the data selection portion selects only a difference vector in which the time difference is not more than a predetermined value.

11. The physical quantity measuring device of claim 1, wherein the measurement parameter includes a magnitude of a difference vector, and the data selection portion selects only a difference vector in which the magnitude of the difference vector is not less than a predetermined value.

12. The physical quantity measuring device of claim 1, wherein the measurement parameter includes an angle formed by two difference vectors, and the data selection portion selects only a difference vector in which an angle between a newly calculated difference vector and an already selected difference vector is not less than a predetermined value.

13. The physical quantity measuring device of claim 1, wherein the reliability information includes angle information calculated from the difference vectors used for estimating the coordinates of the reference point, the angle information is information that is calculated from an angle between each of difference vectors of the difference vectors used for estimating the coordinates of the reference point and a vector connecting a middle point of the difference vector and the reference point, and when angles of all the difference vectors of the difference vectors used for estimating the coordinates of the reference point exist within a predetermined range, the reliability determination portion determines that the reference point has the desired reliability.

14. The physical quantity measuring device of claim 1, wherein the reliability information includes distance information calculated from the difference vectors used for estimating the coordinates of the reference point, the distance information is information that is calculated from a distance between a foot of a perpendicular line drawn from the reference point to each of the difference vectors used for estimating the coordinates of the reference point and a middle point of the difference vector, and when a maximum value of the distance calculated from the difference vectors used for estimating the coordinates of the reference point is not more than a predetermined value, the reliability determination portion determines that the reference point has the desired reliability.

15. The physical quantity measuring device of claim 1, wherein, when the vector physical quantity detection means is a two-component vector physical quantity detection means, the reliability information includes distance information calculated from the difference vectors used for estimating the coordinates of the reference point, the distance information is information that is calculated from a distance between a perpendicular bisector of each of the difference vectors and the estimated reference point, and when a maximum value of the distance calculated from the difference vectors used for estimating the coordinates of the reference point is not more than a predetermined value, the reliability determination portion determines that the reference point has the desired reliability.

16. The physical quantity measuring device of claim 1, wherein, when the vector physical quantity detection means is a three-component vector physical quantity detection means, the reliability information includes distance information calculated from the difference vectors used for estimating the coordinates of the reference point, the distance information is information that is calculated from a distance between a perpendicular bisector plane of each of the difference vectors and the reference point, and when a maximum value of the distance calculated from the difference vectors used for estimating the coordinates of the reference point is not more than a predetermined value, the reliability determination portion determines that the reference point has the desired reliability.

17. The physical quantity measuring device of claim 1, wherein the reliability information includes information calculated from a variation in a predetermined number M on the reference points, and when the variation is not more than a predetermined value, the reference points are determined to have the desired reliability.

18. The physical quantity measuring device of claim 1, wherein the reliability information includes information calculated from a variation in individual axial components of data constituting data used for estimating the reference point, and when the variation is not less than a predetermined value, the reference point is determined to have the desired reliability.

19. The physical quantity measuring device of claim 1, wherein the reliability information includes a distance between datum of the data used for estimating the reference point and the reference point, and when the distance between datum of the data used for estimating the reference point and the reference point exists within a predetermined range, the reference point is determined to have the desired reliability.

20. The physical quantity measuring device of claim 1, wherein the reliability information includes information calculated from a distance between datum of data used for estimating the reference point and a plane which is determined on a coordinate axis where each component of physical quantity data is a coordinate component such that a sum of distances between the plane and datum of the data used for estimating the reference point is minimized, and when the maximum value of the distance from the plane calculated from the data used for estimating the reference point is not less than a predetermined value, the reference point is determined to have the desired reliability.

21. The physical quantity measuring device of claim 1, wherein the reliability information includes information calculated from a time difference between a time when data are first obtained from data used for estimating the reference point and a time when data are last obtained, and when the time difference is not more than a predetermined value, the reference point is determined to have the desired reliability.

22. The physical quantity measuring device of claim 1,
wherein the calculation parameter includes the number M of reference points used for calculating a variation in the reference points.

23. The physical quantity measuring device of claim 2,
wherein a state of the offset estimation parameter used for estimating the offset is output to an outside.

24. The physical quantity measuring device of claim 1,
wherein at least one from the group consisting of the reliability information and the degree of reliability is output.

25. The physical quantity measuring device of claim 1,
wherein the vector physical quantity detection means is a magnetic sensor that detects magnetism as the vector physical quantity datum.

26. The physical quantity measuring device of claim 1,
wherein the vector physical quantity detection means is an acceleration sensor that detects acceleration as the vector physical quantity datum.

27. A physical quantity measuring method of measuring a physical quantity, comprising steps of:
detecting a vector physical quantity composed of a plurality of components;
repeatedly obtaining the detected vector physical quantity as vector physical quantity datum to obtain vector physical quantity data; and
calculating difference vectors from the obtained vector physical quantity data and statistically estimating an offset included in the obtained vector physical quantity data based on a predetermined evaluation formula using the calculated difference vectors,
wherein the step of estimating the offset comprises the steps of:
calculating the difference vectors using a difference between each component of the obtained vector physical quantity data;
selecting and storing the difference vectors based on a predetermined measurement parameter;
statistically estimating, based on the evaluation formula using the selected difference vectors, coordinates of a reference point on a coordinate system where each component of the obtained vector physical quantity data is a coordinate value; and
calculating reliability information on the reference point using the difference vectors according to a calculation parameter for calculating the reliability information on the reference point, comparing the reliability information with a determination threshold value to determine a degree of reliability on the reference point and outputting the reference point determined to have a desired reliability as an offset included in the vector physical quantity data obtained in the vector physical quantity data obtaining step; and
wherein the evaluation formula is determined using an N-th power of an absolute value of an inner product of the difference vector and a vector connecting a middle point of the difference vector and the reference point.

28. The physical quantity measuring method of claim 27,
wherein the step of the estimating offset includes step of managing, as an offset estimation parameter, the determination threshold value, the measurement parameter and the calculation parameter, and the offset estimation parameter management step changes the offset estimation parameter based on at least one of the reliability information calculated by the reliability determination portion, and the determined degree of reliability, and a number of times that the desired reliability is determined, and a time during which the offset estimation parameter is used.

29. The physical quantity measuring method of claim 28,
further comprising a step of detecting a change in a circumstance inside and outside the physical quantity measuring device or an operation of an operator,
wherein, when an event occurs, the offset estimation parameter management portion determines that there is a possibility that the degree of reliability of the output offset is degraded, and changes the offset estimation parameter.

30. The physical quantity measuring method of claim 29,
wherein the change of circumstance is a change of temperature.

31. The physical quantity measuring method of claim 29 or 30,
wherein, when data obtained in the vector physical quantity data obtaining step exceed a predetermined range, the offset estimation parameter management portion determines that the circumstance has changed, and changes the offset estimation parameter.

32. The physical quantity measuring method of claim 27,
wherein the N is two.

33. The physical quantity measuring method of claim 27,
wherein the measurement parameter includes a time interval at which the step of detecting vector physical quantity detects the physical quantity or a time interval at which the vector physical quantity data obtaining step of obtains the vector physical quantity.

34. The physical quantity measuring method of claim 27,
wherein the measurement parameter includes an amount of change of data,
the amount of change is a difference between the vector physical quantity data obtained by the vector physical quantity data obtaining step and the data selected by the different vectors selection step, and
the different vectors selection step selects the data in which the amount of change of data is not less than a predetermined value.

35. The physical quantity measuring method of claim 27,
wherein the measurement parameter includes a number value of vector physical quantity data to estimate the reference point by the step of estimating the offset.

36. The physical quantity measuring method of claim 27,
wherein the measurement parameter includes a time difference when two vector physical quantity data constituting a difference vector are obtained, and
the different vectors selection step selects only a difference vector in which the time difference is not more than a predetermined value.

37. The physical quantity measuring method of claim 27,
wherein the measurement parameter includes a magnitude of a difference vector, and
the different vectors selection step selects only a difference vector in which the magnitude of the difference vector is not less than a predetermined value.

38. The physical quantity measuring method of claim 27,
wherein the measurement parameter includes an angle formed by two difference vectors, and
the different vectors selection step selects only a difference vector in which an angle formed by a newly calculated difference vector and an already selected difference vector is not less than a predetermined value.

39. The physical quantity measuring method of claim 27, wherein the reliability information includes angle information calculated from the difference vectors used for estimating the coordinates of the reference point,
the angle information is information that is calculated from an angle between each of difference vectors of the difference vectors used for estimating the coordinates of the reference point and a vector connecting a middle point of the difference vector and the reference point, and
when angles of all the difference vectors of the difference vectors used for estimating the coordinates of the reference point exist within a predetermined range, the step of determining reliability determines that the reference point has the desired reliability.

40. The physical quantity measuring method of claim 27, wherein the reliability information includes distance information calculated from the difference vectors used for estimating the coordinates of the reference point,
the distance information is information that is calculated from a distance between a foot of a perpendicular line drawn from the reference point to each of the difference vectors used for estimating the coordinates of the reference point and a middle point of the difference vector, and
when a maximum value of the distance calculated from the difference vectors used for estimating the coordinates of the reference point is not more than a predetermined value, the step of determining reliability determines that the reference point has the desired reliability.

41. The physical quantity measuring method of claim 27, wherein, when the step of detecting vector physical quantity is a step of detecting two-component vector physical quantity,
the reliability information includes distance information calculated from the difference vectors used for estimating the coordinates of the reference point,
the distance information is information that is calculated from a distance between a perpendicular bisector of each of the difference vectors and the reference point, and
when a maximum value of the distance calculated from the difference vectors used for estimating the coordinates of the reference point is not more than a predetermined value, a step of reliability determination determines that the reference point has the desired reliability.

42. The physical quantity measuring method of claim 27, wherein, when the step of detecting vector physical quantity is a step of detecting three-component vector physical quantity,
the reliability information includes distance information calculated from the difference vectors used for estimating the coordinates of the reference point,
the distance information is information that is calculated from a distance between a perpendicular bisector plane of each of the difference vectors and the reference point, and
when a maximum value of the distance calculated from the difference vectors used for estimating the coordinates of the reference point is not more than a predetermined value, a reliability determination step determines that the reference point has the desired reliability.

43. The physical quantity measuring method of claim 27, wherein the reliability information includes information calculated from a variation in a predetermined number M on reference points, and when the variation is not more than a predetermined value, the reference points are determined to have the desired reliability.

44. The physical quantity measuring method of claim 27, wherein the reliability information includes information calculated from a variation in individual axial components of data constituting data used for estimating the reference point, and when the variation is not less than a predetermined value, the reference point is determined to have the desired reliability.

45. The physical quantity measuring method of claim 27, wherein the reliability information includes a distance between datum of the data used for estimating the reference point and the reference point, and when the distance between datum of the data used for estimating the reference point and the reference point exists within a predetermined range, the reference point is determined to have the desired reliability.

46. The physical quantity measuring method of claim 27, wherein the reliability information includes information calculated from a distance between datum of the data and a plane which is determined on a coordinate axis where each component of physical quantity data is a coordinate component such that a sum of distances between the plane and datum of the data used for estimating the reference point is minimized, and
when the maximum value of the distance from the plane calculated from the data used for estimating the reference point is not less than a predetermined value, the reference point is determined to have the desired reliability.

47. The physical quantity measuring method of claim 27, wherein the reliability information includes information calculated from a time difference between a time when data is first obtained from data used for estimating the reference point and a time when data is last obtained, and
when the time difference is not more than a predetermined value, the reference point is determined to have the desired reliability.

48. The physical quantity measuring method of claim 27, wherein the calculation parameter includes a number M of reference points used for calculating a variation in the reference points.

49. The physical quantity measuring method of claim 28, wherein a state of the offset estimation parameter used for estimating the offset is output to an outside.

50. The physical quantity measuring method of claim 27, wherein at least one from the group consisting of the reliability information and the degree of reliability is output.

51. The physical quantity measuring method of claim 27, wherein the step of detecting vector physical quantity detects magnetism as the vector physical quantity datum by a magnetic sensor.

52. The physical quantity measuring method of claim 27, wherein the step of detecting vector physical quantity detects acceleration as the vector physical quantity datum by an acceleration sensor.

* * * * *